(12) United States Patent
Savatsky et al.

(10) Patent No.: US 8,318,872 B2
(45) Date of Patent: *Nov. 27, 2012

(54) METHOD FOR CONTROLLING BIMODAL CATALYST ACTIVITY DURING POLYMERIZATION

(75) Inventors: Bruce J. Savatsky, Kingwood, TX (US); John H. Oskam, Flemington, NJ (US); Mark W. Blood, Hurricane, WV (US); Mark B. Davis, Lake Jackson, TX (US); Douglas H. Jackson, Flatwoods, KY (US); Timothy R. Lynn, Glen Gardner, NJ (US); Daniel P. Zilker, Jr., Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/808,946

(22) PCT Filed: Dec. 17, 2008

(86) PCT No.: PCT/US2008/013792
§ 371 (c)(1),
(2), (4) Date: Jul. 26, 2011

(87) PCT Pub. No.: WO2009/082451
PCT Pub. Date: Jul. 2, 2009

(65) Prior Publication Data
US 2011/0275772 A1 Nov. 10, 2011

Related U.S. Application Data

(60) Provisional application No. 61/008,009, filed on Dec. 18, 2007.

(51) Int. Cl.
C08F 4/06 (2006.01)
C08F 4/44 (2006.01)
C08F 4/68 (2006.01)
C08F 4/00 (2006.01)
C08F 4/80 (2006.01)
C08F 210/00 (2006.01)
C08F 110/02 (2006.01)

(52) U.S. Cl. ........ 526/113; 526/114; 526/116; 526/117; 526/118; 526/119; 526/161; 526/171; 526/348; 526/352

(58) Field of Classification Search ............... 526/113, 526/114, 116, 117, 118, 119, 161, 171, 348, 526/352
See application file for complete search history.

(56) References Cited

U.S. PATENT DOCUMENTS

| | | |
|---|---|---|
| 5,064,802 A | 11/1991 | Stevens et al. |
| 5,145,819 A | 9/1992 | Winter et al. |
| 5,239,022 A | 8/1993 | Winter et al. |
| 5,243,001 A | 9/1993 | Winter et al. |
| 5,276,208 A | 1/1994 | Winter et al. |
| 5,278,264 A | 1/1994 | Spaleck et al. |
| 5,296,434 A | 3/1994 | Karl et al. |
| 5,304,614 A | 4/1994 | Winter et al. |
| 5,321,106 A | 6/1994 | LaPointe |
| 5,329,031 A | 7/1994 | Miyake et al. |
| 5,677,401 A | 10/1997 | Kataoka et al. |
| 5,723,398 A | 3/1998 | Rosen et al. |
| 5,753,578 A | 5/1998 | Santi et al. |
| 5,854,363 A | 12/1998 | Jung et al. |
| 5,856,547 A | 1/1999 | Jung et al. |
| 5,858,903 A | 1/1999 | Sylvester et al. |
| 5,859,158 A | 1/1999 | Mukaiyama et al. |
| 5,900,517 A | 5/1999 | Biagini et al. |
| 5,939,503 A | 8/1999 | Goddard et al. |
| 6,274,684 B1 * | 8/2001 | Loveday et al. ............... 526/114 |
| 6,608,149 B2 | 8/2003 | Mawson et al. |
| 6,828,395 B1 | 12/2004 | Ehrman et al. |
| 6,841,631 B2 * | 1/2005 | Loveday et al. ............... 526/114 |
| 6,894,128 B2 * | 5/2005 | Loveday et al. ............... 526/113 |
| 6,956,094 B2 | 10/2005 | Mawson et al. |
| 7,754,840 B2 * | 7/2010 | Loveday et al. ............... 526/352 |
| RE41,897 E * | 10/2010 | Loveday et al. ............... 526/114 |
| 2002/0052453 A1 * | 5/2002 | Loveday et al. ............... 526/113 |
| 2005/0085600 A1 * | 4/2005 | Ehrman et al. ................ 526/114 |

FOREIGN PATENT DOCUMENTS

| | | |
|---|---|---|
| EP | 578 838 | 1/1994 |
| EP | 638595 | 2/1995 |
| EP | 513380 | 10/1997 |
| EP | 816372 | 1/1998 |
| EP | 839 834 | 5/1998 |
| EP | 0853091 | 7/1998 |
| EP | 632819 | 9/1998 |
| EP | 757996 | 9/1998 |
| EP | 748821 | 11/1998 |
| WO | WO 91/04257 | 4/1991 |
| WO | WO 92/00333 | 1/1992 |
| WO | WO 93/08199 | 4/1993 |
| WO | WO 93/08221 | 4/1993 |
| WO | WO 94/03506 | 2/1994 |
| WO | WO 94/07928 | 4/1994 |
| WO | WO 95/07140 | 3/1995 |

(Continued)

*Primary Examiner* — William Cheung
(74) *Attorney, Agent, or Firm* — Jennifer A. Schmidt; Kristina Leavitt

(57) ABSTRACT

A method of performing a polymerization reaction in a gas phase polymerization reactor to produce a bimodal polymer while controlling activity of a bimodal polymerization catalyst composition in the reactor by controlling concentration of at least one induced condensing agent ('ICA') in the reactor is provided. In some embodiments, the ICA is isopentane (or another hydrocarbon compound) and the bimodal catalyst composition includes a Group 15 and metal containing catalyst compound (or other HMW catalyst for catalyzing polymerization of a high molecular weight fraction of the product), and a metallocene catalyst compound (or other LMW catalyst for catalyzing polymerization of a low molecular weight fraction of the product).

13 Claims, 3 Drawing Sheets

FOREIGN PATENT DOCUMENTS

| | | |
|---|---|---|
| WO | WO 96/00244 | 1/1996 |
| WO | WO 97/15602 | 5/1997 |
| WO | WO 98/11144 | 3/1998 |
| WO | WO 98/41529 | 9/1998 |
| WO | WO 98/41530 | 9/1998 |
| WO | WO 98/46650 | 10/1998 |
| WO | WO 99/02540 | 1/1999 |
| WO | WO 99/14221 | 3/1999 |
| WO | WO 99/20637 | 4/1999 |
| WO | WO 01/30861 | 5/2001 |
| WO | WO 01/30862 | 5/2001 |
| WO | WO 02/44222 | 6/2002 |
| WO | WO 02/46246 | 6/2002 |
| WO | WO 2007/030915 | 3/2007 |

* cited by examiner

METHOD FOR CONTROLLING BIMODAL CATALYST ACTIVITY DURING POLYMERIZATION

CROSS REFERENCE TO RELATED APPLICATIONS

This application is a National Stage entry under 36 U.S.C. 371 of International Application No. PCT/US2008/013792, filed Dec. 17, 2008, and claims the benefit of Ser. No. 61/008,009, filed Dec. 18, 2007, the disclosure of which is incorporated by reference.

FIELD OF THE INVENTION

The invention generally relates to the control of gas phase polymerization reactions. Some embodiments of the invention are methods for controlling the activity of catalyst compositions for catalyzing polymerization reactions that produce bimodal polymer products (e.g., bimodal polyethylene or other polyolefin products) by controlling the concentration of isopentane or at least one other induced condensing agent ("ICA") in the polymerization reactor

BACKGROUND

Herein the expression "catalyst composition" denotes a catalyst, or more than one catalyst, or a catalyst system useful for catalyzing a polymerization reaction.

Advances in polymerization and catalysis have resulted in the capability to produce many new polymers having improved physical and chemical properties useful in a wide variety of superior products and applications. With the development of new catalysts the choice of polymerization process for producing a particular polymer has been greatly expanded. Also, advances in polymerization technology have provided more efficient, highly productive, and economically enhanced processes. Illustrative of these advances is the development of technology utilizing metallocene catalyst systems and other advanced metallocene-type catalyst systems.

It is commercially important to produce "bimodal" polymers. A bimodal polymer has at least one low molecular weight fraction and at least one high molecular weight fraction, and a molecular weight distribution that determines an identifiable (relatively high) molecular weight for the high molecular weight fraction and another identifiable (relatively low) molecular weight for the low molecular weight fraction. A multimodal polymer has at least two (e.g., two, three or more) molecular weight fractions, and a molecular weight distribution that determines a different identifiable molecular weight each molecular weight fraction. In the present disclosure, the expression "bimodal polymer" denotes any polymer in the broad class of multimodal polymers, regardless of whether the polymer has only two or more than two molecular weight fractions.

The molecular weight distribution of a bimodal polymer is sometimes described by the ratio of weight average molecular weight of a high molecular weight fraction thereof to weight average molecular weight of a low molecular weight fraction thereof. Another parameter sometimes used to describe the molecular weight distribution of a bimodal polymer (or of each molecular weight fraction of such a polymer) is the polydispersity index $M_w/M_n$, where $M_w$ denotes weight average molecular weight and $M_n$ denotes number average molecular weight. Each molecular weight fraction of a bimodal polymer typically has a different density.

It would be desirable to control the activation of at least one of the catalyst components (i.e., a number, M, of the catalyst components, where M is not less than one) of a polymerization catalyst composition (e.g., a polymerization catalyst system) including N catalyst components (where N is a number not less than two, and N>M), during a polymerization reaction (catalyzed by the catalyst or catalyst system) for producing a bimodal polymer, to control the polymer's molecular weight distribution.

Herein, the expression "bimodal catalyst composition" (or "bimodal catalyst system") denotes a catalyst composition (or catalyst system) useful to catalyze a polymerization reaction to produce a bimodal polymer. A bimodal catalyst composition includes at least two catalyst compounds: at least one (sometimes referred to herein as an "HMW catalyst") for catalyzing polymerization of a high molecular weight fraction of the product and at least one (sometimes referred to herein as an "LMW catalyst") for catalyzing polymerization of a low molecular weight fraction of the product.

Typical polymerization reactions in a fluidized bed gas phase reactor employ a continuous cycle. In one part of the cycle, a cycling gas stream (sometimes referred to as a recycle stream or fluidizing medium) is heated in the reactor by the heat of polymerization. This heat is removed from the recycle stream in another part of the cycle by a cooling system external to the reactor. Generally, in a gas fluidized bed process for producing a polymer product, the recycle stream is a primarily gaseous stream containing one or more monomers that is continuously cycled through the fluidized bed in the presence of a catalyst under reactive conditions. The recycle stream is withdrawn from the fluidized bed and (after cooling) is recycled back into the reactor. Simultaneously, polymer product is withdrawn from the reactor and fresh monomer is added to replace the polymerized monomer.

In some conventional polymerization reactions, a fluidized bed gas phase reactor system operates in a "condensed mode" (see, e.g., WO 2007/030915) in which the recycle stream is cooled to a temperature below the dew point in the reactor. Typically, this is accomplished by causing at least one induced condensing agent ("ICA"), in an appropriate concentration or concentrations, to be included in the recycle stream (and by controlling the recycle stream temperature) so that a portion of the recycle gas stream condenses. The resulting recycle stream contains entrained liquid.

SUMMARY

In a class of embodiments, the inventive method includes the step of performing a polymerization reaction in a gas phase polymerization reactor (catalyzed by a bimodal polymerization catalyst composition) to produce a bimodal polymer, while controlling activity of the bimodal polymerization catalyst composition by controlling concentration of at least one induced condensing agent ("ICA") in the reactor, thereby controlling at least one property of the bimodal polymer. The concentration of each ICA can be controlled by varying the ICA concentration or maintaining the concentration at least substantially constant. The concentration of each ICA in a set of at least two ICAs in a gas phase polymerization reactor is controlled in some embodiments, to control activity of a bimodal polymerization catalyst composition in the reactor. In a class of embodiments, at least one ICA whose concentration is controlled is or includes isopentane. Examples of ICAs whose concentrations are controlled in some embodiments are hexane, isohexane, pentane, isopentane, butane, isobutane and other hydrocarbon compounds that are non-reactive in the polymerization process.

In some embodiments, the bimodal catalyst composition whose activity is controlled in accordance with the invention includes a Group 15 and metal containing catalyst compound and a metallocene catalyst compound (preferably combined with supported alumoxane in a slurry), and a trim solution of one or the other of these two catalyst compounds.

Control of ICA (e.g., isopentane) concentration in accordance with the invention preferably controls the relative activity of the HMW catalyst of the bimodal catalyst composition being used (e.g., the Group 15 and metal containing catalyst compound of the bimodal catalyst composition mentioned in the previous paragraph) the LMW catalyst of the bimodal catalyst composition (e.g., the metallocene catalyst compound of the bimodal catalyst composition mentioned in the previous paragraph), thereby controlling the relative amounts of the high and low molecular weight fractions of the bimodal product produced.

Increasing ICA (e.g., isopentane) concentration in a gas phase reactor during polymerization can increase activity of a component of a bimodal catalyst composition that catalyzes polymerization of an HMW fraction of a bimodal polymer product (e.g., the Group 15 and metal containing catalyst component of the above-mentioned catalyst composition) relative to that of another component of the bimodal catalyst composition that catalyzes polymerization of an LMW fraction of the product (e.g., the metallocene catalyst component of the above-mentioned composition), thereby increasing the amount of the HMW fraction produced relative to the amount of the LMW fraction produced.

In some embodiments in which the inventive method includes the step of controlling activity of a bimodal catalyst system in a polymerization reactor by controlling (e.g., varying or maintaining at least substantially constant) concentration of isopentane (or at least one other ICA) in the reactor during a polymerization reaction for producing a bimodal polyethylene product (thereby controlling properties of the product), the catalyst system comprises a Group 15 and metal containing catalyst compound (preferably the compound identified below as "Compound 1" (also referred to as "bis(arylamido)Zr dibenzl", where Zr denotes zirconium) for catalyzing polymerization of a high molecular weight ("HMW") fraction of the product, and a metallocene catalyst component (preferably including ligands bonded to zirconium dichloride or zirconium dimethyl) for catalyzing polymerization of a low molecular weight ("LMW") fraction of the product. Herein, the expression "ligand" may refer to substituted cyclopendienyl rings on zirconium. In preferred embodiments, (tetramethylcyclopentadienyl)(n-propylcylcopentadienyl) Zr dichloride or dimethyl, or (pentamethylcyclopentadienyl)(n-propylcylcopentadienyl) Zr dichloride or dimethyl, or bis(n-butylcyclopentadienyl) Zr dichloride is used as the metallocene portion of the bimodal catalyst system.

The bimodal catalyst system typically includes a trim solution in which some of the metallocene catalyst component is dissolved (alternatively, some of the Group 15 and metal containing catalyst compound is dissolved in the trim solution).

In a class of embodiments, the concentration of isopentane or at least one other ICA (e.g. concentration of each ICA in a set of ICAs) in a gas phase polymerization reactor is maintained during a polymerization reaction at an at least substantially constant value (e.g., a constant value) to maintain a bimodal polymer product in compliance with a predetermined product specification set. In typical embodiments in this class, the ICA concentration is maintained at least substantially constant at the highest possible value given other constraints on the reaction. Examples of such other constraints are a need to keep the dew point within the reactor below a maximum allowable temperature and/or to prevent unacceptable reduction in reaction efficiency (e.g., efficiency of the reaction is maintained at at least a predetermined level, and prevented from falling below this level due to such effects as flaring of the ICA and/or dissolution of the ICA into the polymer product).

In a class of embodiments, the concentration of isopentane or at least one other ICA (e.g. the concentration of each ICA in a set of ICAs) in a gas phase polymerization reactor is varied during a polymerization reaction to implement a predetermined change in at least one of activity of a bimodal catalyst composition and at least one property of a bimodal polymer product being produced (e.g., to bring the bimodal polymer product into compliance with a predetermined specification set).

In another class of embodiments, the polymerization reactor is not operating in a condensed mode (i.e.; it operates in a "non-condensed mode") during performance of the inventive method. In these preferred embodiments, ICA concentration is controlled in accordance with the invention to control activity of a bimodal polymerization catalyst composition in the reactor.

DETAILED DESCRIPTION

Figure 1:
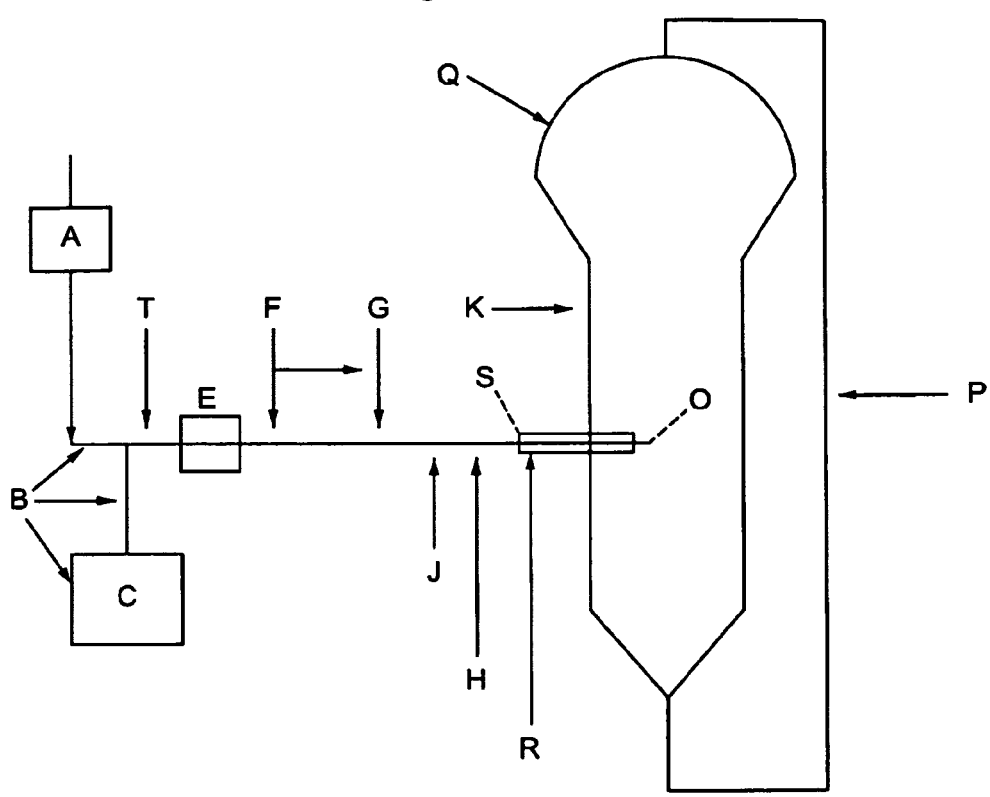
FIG. 1 is a schematic diagram of a polymerization reactor system that may be operated in accordance with an embodiment of the invention.

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

For the sake of brevity, terminology defined in the BACKGROUND will not be repeated here but is incorporated by reference where applicable.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The components of catalyst compositions whose activity can be controlled in accordance with embodiments of the invention include catalyst compounds, activator compounds and support materials. In typical embodiments, the catalyst composition includes catalyst components in a combination of a catalyst slurry and a catalyst solution (e.g., a trim solution). U.S. Pat. Nos. 6,608,149 and 6,956,094 describe many catalyst compositions whose activity can be controlled in accordance with embodiments of the invention, and polymerization reactions in which they can be used.

Catalyst Compounds

Examples of catalyst compounds useful in catalyst compositions whose activity can be controlled in accordance with some embodiments of the invention are: Group 15 and metal containing compounds; metallocene compounds; phenoxide catalyst compounds; conventional-type transition metal catalysts; and other catalyst compounds.

Group 15 and Metal Containing Catalyst Compounds

Catalyst compositions whose activity can be controlled in accordance with some embodiments of the invention include compositions that include one or more Group 15 and metal containing catalyst compounds. The Group 15 and metal containing compound generally includes a Group 3 to 14 metal atom (preferably a Group 3 to 7, more preferably a Group 4 to 6, and even more preferably a Group 4 metal atom) bound to at least one leaving group and also bound to at least two Group 15 atoms, at least one of which is also bound to a Group 15 or 16 atom through another group.

In one embodiment, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In another embodiment, the Group 15 and metal containing compound may be represented by the formulae:

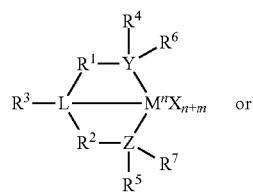

(Formula I)

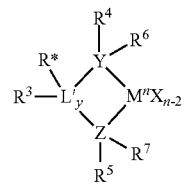

(Formula II)

wherein

M is a Group 3 to 12 transition metal or a Group 13 or 14 main group metal, preferably a Group 4, 5, or 6 metal, and more preferably a Group 4 metal, and most preferably zirconium, titanium or hafnium, each X is independently a leaving group, preferably, an anionic leaving group, and more preferably hydrogen, a hydrocarbyl group, a heteroatom or a halogen, and most preferably an alkyl.

y is 0 or 1 (when y is 0 group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, halogen or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ may also be interconnected to each other.

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and R* is absent, or is hydrogen, a Group 14 atom containing group, a halogen, or a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In a preferred embodiment $R^4$ and $R^5$ are independently a group represented by the following formula:

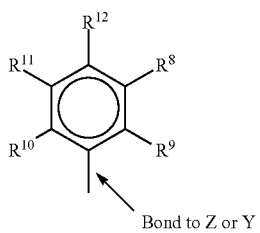

Formula 1 wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In an embodiment $R^4$ and $R^5$ are both a group represented by the following formula:

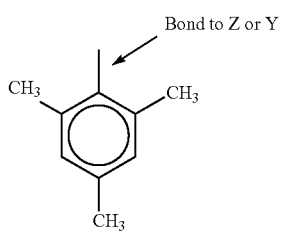

Formula 2

In this embodiment, M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

In a particularly preferred embodiment the Group 15 and metal containing compound is Compound 1 (also referred to as "bis(arylamido)Zr dibenzl") represented below:

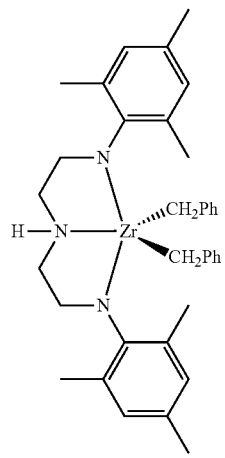

In the representation of Compound 1, "Ph" denotes phenyl. The expression "benzyl" (or "bz") is sometimes used to denote the substance $CH_2Ph$, which is shown in the representation of Compound 1.

Group 15 and metal containing catalyst compounds used in some embodiments can be prepared by methods known in the art. In some cases, the methods disclosed in EP 0 893 454 A1, U.S. Pat. No. 5,889,128 and the references cited in U.S. Pat. No. 5,889,128 are suitable.

A preferred direct synthesis of these compounds comprises reacting the neutral ligand, (see for example YZL or YZL' of formula I or II) with $M''X_n$ (M is a Group 3 to 14 metal, n is the oxidation state of M, each X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group 15 and metal containing compound is prepared by a method comprising reacting a neutral ligand, (see for example YZL or YZL' of formula I or II) with a compound represented by the formula $M''X_n$ (where M is a Group 3 to 14 metal, n is the oxidation state of M, each X is an anionic leaving group) in a non-coordinating or weakly coordinating solvent, at about 20° C. or above, preferably at about 20 to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

In some embodiments the Group 15 and metal containing compound is allowed to age prior to use as a polymerization. It has been noted on at least one occasion that one such catalyst compound (aged at least 48 hours) performed better than a newly prepared catalyst compound.

Metallocene Compounds

The catalyst composition controlled in accordance with the invention may include one or more metallocene compounds (also referred to herein as metallocenes).

Generally, metallocene compounds include half and full sandwich compounds having one or more ligands bonded to at least one metal atom. Typical metallocene compounds are generally described as containing one or more ligand(s) and one or more leaving group(s) bonded to at least one metal atom.

The ligands are generally represented by one or more open, acyclic, or fused ring(s) or ring system(s) or a combination thereof. These ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the catalyst composition includes one or more metallocene catalyst compounds represented by the formula:

$$L^A L^B MQ_n \quad (III)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a heterocyclopentadienyl ancillary ligand. Other $L^A$ and $L^B$ ligands include but are not limited to amides, phosphides, alkoxides, aryloxides, imides, carbolides, borollides, porphyrins, phthalocyanines, corrins and other polyazomacrocycles. Independently, each $L^A$ and $L^B$ may be the same or different type of ligand that is bonded to M. In one embodiment of Formula III only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula III above represents a neutral metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the catalyst composition includes one or more metallocene catalyst compounds where $L^A$ and $L^B$ of Formula III are bridged to each other by at least one bridging group, A, as represented by Formula IV.

$$L^A A L^B MQ_n \quad (IV)$$

The compounds of Formula IV are known as bridged, metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, metallocene catalyst compounds of Formula IV have two or more bridging groups A (EP 664 301 B1).

In another embodiment, the metallocene catalyst compounds are those where the R substituents on the ligands $L^A$ and $L^B$ of Formulas III and IV are substituted with the same or different number of substituents on each of the ligands. In another embodiment, the ligands $L^A$ and $L^B$ of Formulas III and IV are different from each other.

Other metallocene catalysts and catalyst systems controllable in accordance with the invention include those described in U.S. Pat. Nos. 5,064,802, 5,145,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996.

In some embodiments, catalyst compositions controlled in accordance with the invention are or include bridged heteroatom, mono-metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436.

In other embodiments, catalyst compositions controlled in accordance with the invention are or include metallocene catalyst compounds represented by Formula V:

$$L^C AJMQ_n \quad (V)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted ligand bonded to M; J is bonded to M; A is bonded to J and $L^C$; J is a heteroatom ancillary ligand; and A is a bridging group; Q is a univalent anionic ligand; and n is the integer 0, 1 or 2. In Formula V above, $L^C$, A and J form a fused ring system. In an embodiment, $L^C$ of Formula V is as defined above for $L^A$. A, M and Q of Formula V are as defined above in Formula III.

In Formula V J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In some embodiments of the invention, the metallocene catalyst compounds are heterocyclic ligand complexes where the ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258.

In some embodiments, the metallocene catalyst compounds are those complexes known as transition metal catalysts based on bidentate ligands containing pyridine or quinoline moieties, such as those described in U.S. Pat. No. 6,103,657. In other embodiments, the metallocene catalyst compounds are those described in PCT publications WO 99/01481 and WO 98/42664.

In other embodiments, the metallocene catalyst compounds are complexes of a metal, preferably a transition metal, a ligand, preferably a substituted or unsubstituted pi-bonded ligand, and one or more heteroallyl moieties, such as those described in U.S. Pat. Nos. 5,527,752 and 5,747,406 and EP-B1-0 735 057.

In other embodiments, the catalyst or catalyst system controlled in accordance with the invention includes one or more metallocene catalyst compounds represented by Formula VI:

$$L^D MQ_2(YZ)X_n \quad (VI)$$

where M is a Group 3 to 16 metal, preferably a Group 4 to 12 transition metal, and most preferably a Group 4, 5 or 6 transition metal; $L^D$ is a ligand that is bonded to M; each Q is independently bonded to M and Q$_2$(YZ) forms a ligand, preferably a uncharged polydentate ligand; or Q is a univalent anionic ligand also bonded to M; X is a univalent anionic group when n is 2 or X is a divalent anionic group when n is 1; n is 1 or 2.

In Formula VI, L and M are as defined above for Formula III. Q is as defined above for Formula III, preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment, the metallocene catalyst compounds are those described in PCT publications WO 99/01481 and WO 98/42664.

Useful Group 6 metallocene catalyst systems are described in U.S. Pat. No. 5,942,462.

Still other useful catalysts include those multinuclear metallocene catalysts as described in WO 99/20665 and U.S. Pat. No. 6,010,794, and transition metal metaaracyle structures described in EP 0 969 101 A2. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394.

It is also contemplated that in one embodiment the metallocene catalysts, described above, include their structural or optical or enantiomeric isomers (meso and racemic isomers, e.g., those described in U.S. Pat. No. 5,852,143) and mixtures thereof.

It is further contemplated that any one of the metallocene catalyst compounds, described above, have at least one fluoride or fluorine containing leaving group as described in U.S. Pat. No. 6,632,901.

Illustrative but non-limiting examples of metallocene catalyst compounds include: bis(cyclopentadienyl)titanium dimethyl, bis(cyclopentadienyl)titanium diphenyl, bis(cyclopentadienyl)zirconium dimethyl, bis(cyclopentadienyl) zirconium diphenyl, bis(cyclopentadienyl)haffium dimethyl or diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl, bis(cyclopentadienyl)titanium methyl chloride, bis(cyclopentadienyl)titanium ethyl chloride, bis(cyclopentadienyl) titanium phenyl chloride, bis(cyclopentadienyl)zirconium methyl chloride, bis(cyclopentadienyl)zirconium ethyl chloride, bis (cyclopentadienyl)zirconium phenyl chloride, bis(cyclopentadienyl)titanium methyl bromide, cyclopentadienyl titanium trimethyl, cyclopentadienyl zirconium triphenyl, cyclopentadienyl zirconium trineopentyl, cyclopentadienyl zirconium trimethyl, cyclopentadienyl hafnium triphenyl, cyclopentadienyl hafnium trineopentyl, cyclopentadienyl hafnium trimethyl, pentamethylcyclopentadienyl titanium trichloride, pentaethylcyclopentadienyl titanium trichloride, bis(indenyl) titanium diphenyl or dichloride, bis(methylcyclopentadienyl) titanium diphenyl or dihalide, bis(1,2-dimethylcyclopentadienyl)titanium diphenyl or dichloride, bis(1,2-diethylcyclopentadienyl)titanium diphenyl or dichloride, bis(pentamethyl cyclopentadienyl) titanium diphenyl or dichloride; dimethyl silyldicyclopentadienyl titanium diphenyl or dichloride, methyl phosphine dicyclopentadienyl titanium diphenyl or dichloride, methylenedicyclopentadienyl titanium diphenyl or dichloride, isopropyl(cyclopentadienyl)(fluorenyl)zirconium dichloride, isopropyl(cyclopentadienyl)(octahydrofluorenyl)zirconium dichloride, diisopropylmethylene(cyclopentadienyl)(fluorenyl)zirconium dichloride, diisobutylmethylene(cyclopentadienyl)(fluorenyl)zirconium dichloride, ditertbutylmethylene(cyclopentadienyl)(fluorenyl)zirconium dichloride, cyclohexylidene(cyclopentadienyl)(fluorenyl)zirconium dichloride, diisopropylmethylene(2,5-dimethylcyclopentadienyl)(fluorenyl)zirconium dichloride, isopropyl(cyclopentadienyl)(fluorenyl)hafnium dichloride, diphenylmethylene (cyclopentadienyl)(fluorenyl)hafnium dichloride, diisopropylmethylene (cyclopentadienyl)(fluorenyl)hafium dichloride, diisobutylmethylene(cyclopentadienyl) (fluorenyl) hafnium dichloride, ditertbutylmethylene(cyclopentadienyl) (fluorenyl) hafnium dichloride, cyclohexylidene (cyclopentadienyl)(fluorenyl)hafnium dichloride, diisopropylmethylene(2,5-dimethylcyclopentadienyl) (fluorenyl)-hafnium dichloride, isopropyl(cyclopentadienyl)(fluorenyl)titanium dichloride, diphenylmethylene (cyclopentadienyl)(fluorenyl)titanium dichloride, diisopropylmethylene (cyclopentadienyl)(fluorenyl)titanium dichloride, diisobutyl-methylene (cyclopentadienyl)(fluorenyl)titanium dichloride, ditertbutylmethylene (cyclopentadienyl)(fluorenyl)titanium dichloride, cyclohexylidene(cyclopentadienyl) (fluorenyl)titanium dichloride, diisopropylmethylene(2,5 dimethylcyclopentadienyl fluorenyl)titanium dichloride, racemic-ethylene bis(1-indenyl)zirconium (W) dichloride, racemic-ethylene bis (4,5,6,7-tetrahydro-1-indenyl) zirconium (IV) dichloride, racemic-dimethylsilyl bis (1-indenyl) zirconium (IV) dichloride, racemic-dimethylsilyl bis (4,5,6,7-tetrahydro-1-indenyl) zirconium (IV) dichloride, racemic-1,1,2,2-tetramethylsilanylene bis (1-indenyl) zirconium (IV) dichloride, racemic-1,1,2,2-tetramethylsilanylene bis (4,5,6,7-tetrahydro-1-indenyl) zirconium (IV) dichloride, ethylidene (1-indenyl tetramethylcyclopentadienyl) zirconium (IV) dichloride, racemic-dimethylsilyl bis (2-methyl-4-t-butyl-1-cyclopentadienyl) zirconium (IV) dichloride, racemic-ethylene bis (1-indenyl) hafnium (IV) dichloride, racemic-ethylene bis (4,5,6,7-tetrahydro-1-indenyl) hafium (IV) dichloride, racemic-dimethylsilyl bis (1-indenyl) hafnium (IV) dichloride, racemic-dimethylsilyl bis (4,5,6,7-tetrahydro-1-indenyl) hafnium (IV) dichloride, racemic-1,1,2,2-tetramethylsilanylene bis (1-indenyl) hafnium (IV) dichloride, racemic-1,1,2,2-tetramethylsilanylene bis (4,5,6,7-tetrahydro-1-indenyl) hafnium (IV), dichloride, ethylidene (1-indenyl-2,3,4,5-tetramethyl-1-cyclopentadienyl) hafnium (IV) dichloride, racemic-ethylene bis (1-indenyl) titanium (IV) dichloride, racemic-ethylene bis (4,5,6,7-tetrahydro-1-indenyl) titanium (IV) dichloride, racemic-dimethylsilyl bis (1-indenyl) titanium (IV) dichloride, racemic-dimethylsilyl bis (4,5,6,7-tetrahydro-1-indenyl) titanium (IV) dichloride, racemic-1,1,2,2-tetramethylsilanylene bis (1-indenyl) titanium (IV) dichloride racemic-1,1,2,2-tetramethylsilanylene bis (4,5,6,7-tetrahydro-1-indenyl) titanium (IV) dichloride, and ethylidene (1-indenyl-2,3,4,5-tetramethyl-1-cyclopentadienyl) titanium (IV) dichloride.

Preferred metallocene catalyst compounds are diphenylmethylene (cyclopentadienyl)(fluorenyl)zirconium dichloride, racemic-dimethylsilyl bis (2-methyl-1-indenyl) zirconium (IV) dichloride, racemic-dimethylsilyl bis (2-methyl-4-(1-naphthyl-1-indenyl) zirconium (IV) dichloride, and racemic-dimethylsilyl bis (2-methyl-4-phenyl-1-indenyl) zirconium (IV) dichloride. Other preferred metallocene catalyst compounds include, indenyl zirconium tris(diethylcarbamate), indenyl zirconium tris(pivalate), indenyl zirconium tris(p-toluate), indenyl zirconium tris(benzoate), (1-methylindenyl) zirconium tris(pivalate), (2-methylindenyl) zirconium tris(diethylcarbamate), (methylcyclopentadienyl) zirconium tris (pivalate), cyclopentadienyl tris(pivalate), and (pentamethyl-cyclopentadienyl) zirconium tris(benzoate).

Phenoxide Catalyst Compound

The catalyst composition controlled in accordance with some embodiments of the invention includes one or more phenoxide catalyst compounds represented by the following formulae:

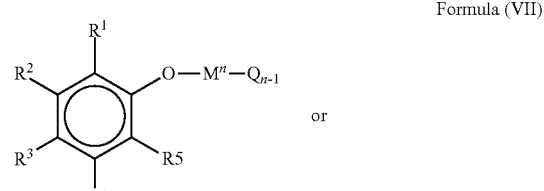

Formula (VII)

or

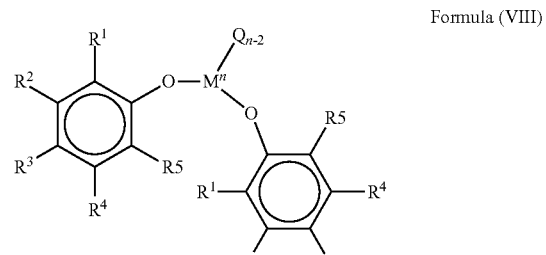

Formula (VIII)

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M, and at least one of $R^2$ to $R^5$ is a group containing a heteroatom, the rest of $R^2$ to $R^5$ are independently hydrogen or a $C_1$ to $C_{100}$ group, preferably a $C_4$ to $C_{20}$ alkyl group (preferably butyl, isobutyl, pentyl hexyl, heptyl, isohexyl, octyl, isooctyl, decyl, nonyl, dodecyl) and any of $R^2$ to $R^5$ also may or may not be bound to M, O is oxygen, M is a group 3 to group 10 transition metal or lanthanide metal, preferably a group 4 metal, preferably Ti, Zr or Hf, n is the valence state of the metal M, preferably 2, 3, 4, or 5, Q is an alkyl, halogen, benzyl, amide, carboxylate, carbamate, thiolate, hydride or alkoxide group, or a bond to an R group containing a heteroatom which may be any of $R^1$ to $R^5$ A heteroatom containing group may be any heteroatom or a heteroatom bound to carbon silica or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include oxygen and nitrogen. The heteroatom itself may be directly bound to the phenoxide ring or it may be bound to another atom or atoms that are bound to the phenoxide ring. The heteroatom containing group may contain one or more of the same or different heteroatoms. Preferred heteroatom groups include imines, amines, oxides, phosphines, ethers, ketenes, oxoazolines heterocyclics, oxazolines, thioethers, and the like. Particularly preferred heteroatom groups include imines. Any two adjacent R groups may form a ring structure, preferably a 5 or 6 membered ring. Likewise the R groups may form multi-ring structures. In one embodiment any two or more R groups do not form a 5 membered ring.

In a preferred embodiment, Q is a bond to any of $R^2$ to $R^5$ and the R group that Q is bound to is a heteroatom containing group.

In some embodiments, the invention is practiced with the catalysts disclosed in European Patent Application EP 0 874 005 A1.

In a preferred embodiment the phenoxide catalyst compound comprises one or more of:

bis(N-methyl-3,5-di-t-butylsalicylimino)zirconium(IV) dibenzyl;
bis(N-ethyl-3,5-di-t-butylsalicylimino)zirconium(IV) dibenzyl;
bis(N-iso-propyl-3,5-di-t-butylsalicylimino)zirconium(IV) dibenzyl;
bis(N-t-butyl-3,5-di-t-butylsalicylimino)zirconium(IV) dibenzyl;
bis(N-benzyl-3,5-di-t-butylsalicylimino)zirconium(IV) dibenzyl;
bis(N-hexyl-3,5-di-t-butylsalicylimino)zirconium(IV) dibenzyl;
bis(N-phenyl-3,5-di-t-butylsalicylimino)zirconium(IV) dibenzyl;
bis(N-methyl-3,5-di-t-butylsalicylimino)zirconium(IV) dibenzyl;
bis(N-benzyl-3,5-di-t-butylsalicylimino)zirconium(IV) dichloride;
bis(N-benzyl-3,5-di-t-butylsalicylimino)zirconium(IV) dipivalate;
bis(N-benzyl-3,5-di-t-butylsalicylimino)titanium(IV) dipivalate;
bis(N-benzyl-3,5-di-t-butylsalicylimino)zirconium(IV) di(bis(dimethylamide));
bis(N-iso-propyl-3,5-di-t-amylsalicylimino)zirconium(IV) dibenzyl;
bis(N-iso-propyl-3,5-di-t-octylsalicylimino)zirconium(IV) dibenzyl;
bis(N-iso-propyl-3,5-di-(1',1'-dimethylbenzyl)salicylimino)zirconium(IV) dibenzyl;
bis(N-iso-propyl-3,5-di-(1',1'-dimethylbenzyl)salicylimino)titanium(IV) dibenzyl;
bis(N-iso-propyl-3,5-di-(1',1'-dimethylbenzyl)salicylimino)hafnium(IV) dibenzyl;
bis(N-iso-butyl-3,5-di-(1',1'-dimethylbenzyl)salicylimino)zirconium(IV) dibenzyl;
bis(N-iso-butyl-3,5-di-(1',1'-dimethylbenzyl)salicylimino)zirconium(IV) dichloride;
bis(N-hexyl-3,5-di-(1',1'-dimethylbenzyl)salicylimino)zirconium(IV) dibenzyl;
bis(N-phenyl-3,5-di-(1',1'-dimethylbenzyl)salicylimino)zirconium(IV) dibenzyl;
bis(N-iso-propyl-3,5-di-(1'-methylcyclohexyl)salicylimino)zirconium(IV) dibenzyl;
bis(N-benzyl-3-t-butylsalicylimino)zirconium(IV) dibenzyl;
bis(N-benzyl-3-triphenylmethylsalicylimino)zirconium(IV) dibenzyl;
bis(N-iso-propyl-3,5-di-trimethylsilylsalicylimino)zirconium(IV) dibenzyl;
bis(N-iso-propyl-3-(phenyl)salicylimino)zirconium(IV) dibenzyl;
bis(N-benzyl-3-(2',6'-di-iso-propylphenyl)salicylimino)zirconium(IV) dibenzyl;
bis(N-benzyl-3-(2',6'-di-phenylphenyl)salicylimino)zirconium(IV) dibenzyl;
bis(N-benzyl-3-t-butyl-5-methoxysalicylimino)zirconium(IV) dibenzyl;
bis(2-(2H-benzotriazol-2-yl)-4,6-di-t-amylphenoxide)zirconium(IV) dibenzyl;
bis(2-(2H-benzotriazol-2-yl)-4,6-di-t-amylphenoxide)zirconium(IV) dichloride;
bis(2-(2H-benzotriazol-2-yl)-4,6-di-t-amylphenoxide)zirconium(IV) di(bis(dimethylamide)); bis(2-(2H-benzotriazol-2-yl)-4,6-di-(1',1'-dimethylbenzyl)phenoxide)zirconium(IV) dibenzyl;
bis(2-(2H-benzotriazol-2-yl)-4,6-di-t-amylphenoxide)titanium(IV) dibenzyl;
bis(2-(2H-benzotriazol-2-yl)-4,6-di-(1',1'-dimethylbenzyl)phenoxide)titanium(IV) dibenzyl;
bis(2-(2H-benzotriazol-2-yl)-4,6-di-(1',1'-dimethylbenzyl)phenoxide)titanium(IV) dichloride;
bis(2-(2H-benzotriazol-2-yl)-4,6-di-(1',1'-dimethylbenzyl)phenoxide)hafnium(IV) dibenzyl;
(N-phenyl-3,5-di-(1',1'-dimethylbenzyl)salicylimino)zirconium(IV) tribenzyl;
(N-(2',6'-di-iso-propylphenyl)-3,5-di-(1',1'-dimethylbenzyl)salicylimino)zirconium(IV) tribenzyl;
(N-(2',6'-di-iso-propylphenyl)-3,5-di-(1',1'-dimethylbenzyl)salicylimino)titanium(IV) tribenzyl; and (N-(2',6'-di-iso-propylphenyl)-3,5-di-(1',1'-dimethylbenzyl)salicylimino)zirconium(IV) trichloride.

Other Catalyst Compounds

The catalyst compositions in accordance with some embodiments of the invention include one or more complexes known as transition metal catalysts based on bidentate ligands containing pyridine or quinoline moieties, e.g., those described in U.S. Pat. No. 6,103,657.

In one embodiment, these catalyst compounds are represented by the formula:

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

The catalyst compounds in accordance with some embodiments of include complexes of $Ni^{2+}$ and $Pd^{2+}$, e.g., as described in the articles Johnson, et al., "New Pd(II)- and Ni(II)-Based Catalysts for Polymerization of Ethylene and a-Olefins", J. Am. Chem. Soc. 1995, 117, 6414-6415 and Johnson, et al., "Copolymerization of Ethylene and Propylene with Functionalized Vinyl Monomers by Palladium(II) Catalysts", J. Am. Chem. Soc., 1996, 118, 267-268, and WO 96/23010 published Aug. 1, 1996, WO 99/02472, and U.S. Pat. Nos. 5,852,145, 5,866,663 and 5,880,241. These complexes can be either dialkyl ether adducts, or alkylated reaction products of the described dihalide complexes that can be activated to a cationic state by appropriate activators.

Other catalyst compounds in accordance with some embodiments of the invention are nickel complexes of the type described in WO 99/50313.

Other catalyst compounds in accordance with some embodiments of the invention are those diimine based ligands of Group 8 to 10 metal catalyst compounds disclosed in PCT publications WO 96/23010 and WO 97/48735 and Gibson, et al., Chem. Comm., pp. 849-850 (1998).

Other useful catalyst compounds are those Group 5 and 6 metal imido complexes described in EP-A2-0 816 384 and U.S. Pat. No. 5,851,945. In addition, metallocene catalysts include bridged bis(arylamido) Group 4 compounds described by D. H. McConville, et al., in Organometallics 1195, 14, 5478-5480. In addition, bridged bis(amido) catalyst compounds are described in WO 96/27439. Other useful catalysts are described as bis(hydroxy aromatic nitrogen ligands) in U.S. Pat. No. 5,852,146. Other useful catalysts containing one or more Group 15 atoms include those described in WO 98/46651.

Conventional Transition Metal Catalysts

The catalyst compositions in accordance with other embodiments of the invention include conventional-type transition metal catalysts. Conventional-type transition metal catalysts are those traditional Ziegler-Natta, vanadium and Phillips-type catalysts well known in the art, such as, for example Ziegler-Natta catalysts as described in *Ziegler-Natta Catalysts and Polymerizations*. John Boor, Academic Press, New York, 1979. Examples of conventional-type transition metal catalysts are also discussed in U.S. Pat. Nos. 4,115,639, 4,077,904, 4,482,687, 4,564,605, 4,721,763, 4,879,359 and 4,960,741. The conventional-type transition metal catalyst compounds that may be included in catalyst compositions controlled in accordance with the invention include transition metal compounds from Groups 3 to 17, preferably 4 to 12, more preferably 4 to 6 of the Periodic Table of Elements.

Conventional-type transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the oxidation state of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.\frac{1}{3}AlCl_3$ and $Ti(OC_{12}H_{25})Cl_3$.

Conventional-type transition metal catalyst compounds based on magnesium/titanium electron-donor complexes that may be included in catalyst compositions controlled in accordance with the invention are described in, for example, U.S. Pat. Nos. 4,302,565 and 4,302,566. The $MgTiCl_6$ (ethyl acetate)$_4$ derivative is particularly preferred.

British Patent Application 2,105,355 and U.S. Pat. No. 5,317,036 describe various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904.

Still other conventional-type transition metal catalysts and catalyst systems suitable for use in some embodiments of the invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436.

Other catalysts in accordance with some embodiments of the invention are or include cationic catalysts such as $AlCl_3$, and other cobalt, iron, nickel and palladium catalysts well known in the art. See for example U.S. Pat. Nos. 3,487,112, 4,472,559, 4,182,814 and 4,689,437.

It is also contemplated that other catalysts can be included in the catalyst compositions controlled in accordance with some embodiments of the invention, for example, as disclosed in U.S. Pat. Nos. 4,937,299, 4,935,474, 5,281,679, 5,359,015, 5,470,811, and 5,719,241.

It is further contemplated that one or more of the catalyst compounds described above may be used in combination with one or more catalyst compositions (e.g., catalyst systems). Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996.

Activators and Activation Methods

Polymerization catalyst compounds are activated in various known ways to yield compounds having a vacant coordination site that will coordinate, insert, and polymerize olefin(s). Herein, the term "activator" denotes any substance which can activate a catalyst compound (e.g., a catalyst included in a catalyst composition whose activity is controlled in accordance with the invention) by converting the neutral catalyst compound to a catalytically active catalyst compound cation. Examples of activators are alumoxanes, aluminum alkyls, ionizing activators, which may be neutral or ionic, and conventional-type cocatalysts.

Aluminoxane and Aluminum Alkyl Activators

Alumoxanes activators are utilized as activators in the catalyst compositions whose activity is controlled in accordance with some embodiments of the invention. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534. A another alumoxane is a modified methyl alumoxane (MMAO) cocatalyst type 3A (commercially available from Akzo Chemicals, Inc. under the trade name Modified Methylalumoxane type 3A, and described in U.S. Pat. No. 5,041,584).

Aluminum Alkyl or organoaluminum compounds which may be utilized as activators include trimethylaluminum, triethylaluminum, triisobutylaluminum, tri-n-hexylaluminum, tri-n-octylaluminum and the like.

Ionizing Activators

A catalyst whose activity is controlled in accordance with some embodiments of the invention is primarily activated using an ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. A catalyst whose activity is controlled in accordance with some embodiments of the invention is primarily activated using neutral or ionic activators alone or in combination with alumoxane or modified alumoxane activators.

Examples of neutral stoichiometric activators include trisubstituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124.

In some embodiments, the stoichiometric activators include a cation and an anion component, and may be represented by the following formula:

$$(L-H)_d^+ (A^{d-}) \tag{X}$$

wherein L is an neutral Lewis base;

H is hydrogen;

$(L-H)^+$ is a Bronsted acid $A^{d-}$ is a non-coordinating anion having the charge d– d is an integer from 1 to 3.

The cation component, $(L-H)_d^+$ may include Bronsted acids such as protons or protonated Lewis bases or reducible Lewis acids capable of protonating or abstracting a moiety, such as an akyl or aryl, from the metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ include those having the formula $[M^{k+}Q_n]^{d-}$ wherein k is an integer from 1 to 3; n is an integer from 2-6; n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895.

Illustrative, but not limiting examples of boron compounds which may be used as an activating cocatalyst in the preparation of catalysts to be controlled in accordance with the invention are tri-substituted ammonium salts such as:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate,
N,N-dimethyl-(2,4,6-trimethylanilinium) tetrakis(pentafluorophenyl) borate,
trimethylammonium tetrakis-(2,3,4,6-tetrafluorophenylborate,
triethylammonium tetrakis-(2,3,4,6-tetrafluorophenyl) borate,
tripropylammonium tetrakis-(2,3,4,6-tetrafluorophenyl) borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl) borate,
N,N-dimethylanilinium tetrakis-(2,3,4,6-tetrafluorophenyl) borate,
N,N-diethylanilinium tetrakis-(2,3,4,6-tetrafluoro-phenyl) borate, and
N,N-dimethyl-(2,4,6-trimethylanilinium)tetrakis-(2,3,4,6-tetrafluorophenyl) borate;
dialkyl ammonium salts such as: di-(i-propyl)ammonium tetrakis(pentafluorophenyl) borate, and dicyclohexylammonium tetrakis(pentafluorophenyl) borate; and tri-substituted phosphonium salts such as: triphenylphosphonium tetrakis(pentafluorophenyl) borate, tri(o-tolyl)phosphonium tetrakis(pentafluorophenyl) borate, and tri(2,6-dimethylphenyl)phosphonium tetrakis(pentafluorophenyl) borate.

Most preferably, the ionic stoichiometric activator $(L-H)_d^+$ $(A^{d-})$ is N,N-dimethylanilinium tetra(perfluorophenyl)borate or triphenylcarbenium tetra(perfluorophenyl)borate.

In some embodiments, the catalyst or catalyst system whose activity is controlled in accordance with some embodiments of the invention is primarily activated using ionizing ionic compounds not containing an active proton but capable of producing a metallocene catalyst cation and their non-coordinating anion (e.g., as described in EP-A-0 426 637, EP-A-0 573 403 and U.S. Pat. No. 5,387,568).

Conventional-Type Cocatalysts

Typically, conventional transition metal catalyst compounds excluding some conventional-type chromium catalyst compounds are activated with one or more of the conventional cocatalysts which may be represented by the formula $M^3M^4{}_vX^2{}_cR^3{}_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3{}_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415

Additional Activators

Other activators include those described in PCT publication WO 98/07515 such as tris (2, 2', 2"-nonafluorobiphenyl) fluoroaluminate. The catalyst or catalyst system whose activity is controlled in accordance with some embodiments of the invention is primarily activated using combinations of activators, for example, alumoxanes and ionizing activators in combinations (as described, for example, in EP-B1 0 573 120, PCT publications WO 94/07928 and WO 95/14044 and U.S. Pat. Nos. 5,153,157 and 5,453,410).

The catalysts whose activity is controlled in accordance with some embodiments of the invention are primarily activated using activators disclosed in WO 98/09996, which include (for activating metallocene catalyst compounds) perchlorates, periodates and iodates including their hydrates. WO 98/30602 and WO 98/30603 describe the use of lithium (2,2'-bisphenyl-ditrimethylsilicate).4THF as an activator for a metallocene catalyst compound. WO 99/18135 describes the use of organo-boron-aluminum acitivators. EP-B1-0 781 299 describes using a silylium salt in combination with a non-coordinating compatible anion. Also, methods of activation such as using radiation (e.g., as described in EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in for example, U.S. Pat. Nos. 5,849, 852, 5,859,653 and 5,869,723 and WO 98/32775, WO 99/42467 (dioctadecylmethylammonium-bis(tris(pentafluorophenyl)borane) benzimidazolide).

Another suitable ion forming, activating cocatalyst comprises a salt of a cationic oxidizing agent and a noncoordinating, compatible anion represented by the formula: $(OX^{e+})_d$ $(A^{d-})_e$, wherein: $OX^{e+}$ is a cationic oxidizing agent having a charge of e+; e is an integer from 1 to 3; and $A^-$, and d are as previously defined. Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

A catalyst whose activity is controlled in accordance with some embodiments of the invention is primarily activated using a combination of one or more activators or activation methods described above. For example, a combination of activators have been described in U.S. Pat. Nos. 5,153,157 and 5,453,410, European publication EP-B 1 0 573 120, and PCT publications WO 94/07928 and WO 95/14044. These documents all discuss the use of an alumoxane and an ionizing activator with a metallocene catalyst compound.

Supports, Carriers and General Supporting Techniques

In typical embodiments, a catalyst composition whose activity is controlled in accordance with the invention includes a catalyst compound and a support material or carrier, and preferably also a supported activator. For example, the catalyst compound (or activator compound, or catalyst compound and activator compound) may be deposited on, contacted with, vaporized with, bonded to, or incorporated within, adsorbed or absorbed in, or on, a support or carrier.

Support Material

The support material may be any of the conventional support materials. Preferably the supported material is a porous support material, for example, talc, an inorganic oxide, or an inorganic chloride. Other support materials include resinous support materials (e.g., polystyrene), functionalized or crosslinked organic supports, such as polystyrene divinyl benzene polyolefins or polymeric compounds, zeolites, clays, or any other organic or inorganic support material and the like, or mixtures thereof.

Preferred support materials are inorganic oxides that include those Group 2, 3, 4, 5, 13 or 14 metal oxides. The preferred supports include silica, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1.

Other support materials include nanocomposites as described in PCT WO 99/47598, aerogels as described in WO 99/48605, spherulites as described in U.S. Pat. No. 5,972,510 and polymeric beads as described in WO 99/50311. A preferred support is fumed silica available under the trade name Cabosil™ TS-610, available from Cabot Corporation. Fumed silica is typically a silica with particles 7 to 30 nanometers in size that has been treated with dimethylsilyldichloride such that a majority of the surface hydroxyl groups are capped.

It is typically preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 μm. Most preferably the surface area of the support material is in the range is from about 100 to about 400 $m^2/g$, pore volume from about 0.8 to about 3.0 cc/g and average particle size is from about 5 to about 100 μm. The average pore size of the carrier typically has pore size in the range of from 10 to 1000 Å, preferably 50 to about 500 Å, and most preferably 75 to about 350 Å.

The support materials may be treated chemically, for example with a fluoride compound as described in WO 00/12565. Other supported activators are described in for example WO 00/13792 that refers to supported boron containing solid acid complex.

In a method of forming a supported catalyst composition component, the amount of liquid in which the activator is present is in an amount that is less than four times the pore volume of the support material, more preferably less than three times, even more preferably less than two times; preferred ranges being from 1.1 times to 3.5 times range and most preferably in the 1.2 to 3 times range. In an alternative embodiment, the amount of liquid in which the activator is present is from one to less than one times the pore volume of the support material utilized in forming the supported activator.

Procedures for measuring the total pore volume of a porous support are well known in the art.

Supported Activators

In some embodiments, a catalyst composition whose activity is controlled in accordance with the invention includes a supported activator. Many supported activators are described in various patents and publications which include: U.S. Pat. No. 5,728,855 directed to the forming a supported oligomeric alkylaluminoxane formed by treating a trialkylaluminum with carbon dioxide prior to hydrolysis; U.S. Pat. Nos. 5,831, 109 and 5,777,143 discusses a supported methylalumoxane made using a non-hydrolytic process; U.S. Pat. No. 5,731,451 relates to a process for making a supported alumoxane by oxygenation with a trialkylsiloxy moiety; U.S. Pat. No. 5,856, 255 discusses forming a supported auxiliary catalyst (alumoxane or organoboron compound) at elevated temperatures and pressures; U.S. Pat. No. 5,739,368 discusses a process of heat treating alumoxane and placing it on a support; EP-A-0 545 152 relates to adding a metallocene to a supported alumoxane and adding more methylalumoxane; U.S. Pat. Nos. 5,756,416 and 6,028,151 discuss a catalyst composition of a alumoxane impregnated support and a metallocene and an aluminum alkyl and methylalumoxane; EP-B1-0 662 979 discusses the use of a metallocene with a catalyst support of silica reacted with alumoxane; PCT WO 96/16092 relates to a heated support treated with alumoxane and washing to remove unfixed alumoxane; U.S. Pat. Nos. 4,912,075, 4,937, 301, 5,008,228, 5,086,025, 5,147,949, 4,871,705, 5,229,478, 4,935,397, 4,937,217 and 5,057,475, and PCT WO 94/26793 all directed to adding a metallocene to a supported activator; U.S. Pat. No. 5,902,766 relates to a supported activator having a specified distribution of alumoxane on the silica particles; U.S. Pat. No. 5,468,702 relates to aging a supported activator and adding a metallocene; U.S. Pat. No. 5,968,864 discusses treating a solid with alumoxane and introducing a metallocene; EP 0 747 430 A1 relates to a process using a metallocene on a supported methylalumoxane and trimethylaluminum; EP 0 969 019 A1 discusses the use of a metallocene and a supported activator; EP-B2-0 170 059 relates to a polymerization process using a metallocene and a organoaluminum compound, which is formed by reacting aluminum trialkyl with a water containing support; U.S. Pat. No. 5,212, 232 discusses the use of a supported alumoxane and a metallocene for producing styrene based polymers; U.S. Pat. No. 5,026,797 discusses a polymerization process using a solid component of a zirconium compound and a water-insoluble porous inorganic oxide preliminarily treated with alumoxane; U.S. Pat. No. 5,910,463 relates to a process for preparing a catalyst support by combining a dehydrated support material, an alumoxane and a polyfunctional organic crosslinker; U.S. Pat. Nos. 5,332,706, 5,473,028, 5,602,067 and 5,420,220 discusses a process for making a supported activator where the volume of alumoxane solution is less than the pore volume of the support material; WO 98/02246 discusses silica treated with a solution containing a source of aluminum and a metallocene; WO 99/03580 relates to the use of a supported alumoxane and a metallocene; EP-A1-0 953 581 discloses a heterogeneous catalytic system of a supported alumoxane and a metallocene; U.S. Pat. No. 5,015,749 discusses a process for preparing a polyhydrocarbyl-alumoxane using a porous organic or inorganic imbiber material; U.S. Pat. Nos. 5,446,001 and 5,534,474 relates to a process for preparing one or more alkylaluminoxanes immobilized on a solid, particulate inert support; and EP-A1-0 819 706 relates to a process for preparing a solid silica treated with alumoxane. The following articles disclose potentially useful supported activators and methods for their preparation: W. Kaminsky, et al., "Polymerization of Styrene with Supported Half-Sandwich Complexes", Journal of Polymer Science Vol. 37, 2959-2968 (1999) describes a process of adsorbing a methylalumoxane to a support followed by the adsorption of a metallocene; Junting Xu, et al. "Characterization of isotactic polypropylene prepared with dimethylsilyl bis(1-indenyl)zirconium dichloride supported on methylaluminoxane pretreated silica", European Polymer Journal 35 (1999) 1289-1294, discusses the use of silica treated with methylalumoxane and a metallocene; Stephen O'Brien, et al., "EXAFS analysis of a chiral alkene polymerization catalyst incorporated in the mesoporous silicate MCM-41" Chem. Commun. 1905-1906 (1997) discloses an immobilized alumoxane on a modified mesoporous silica; and F. Bonini, et al., "Propylene Polymerization through Supported Metallocene/MAO Catalysts: Kinetic Analysis and Modeling" Journal of Polymer Science, Vol. 33 2393-2402 (1995) discusses using a methylalumoxane supported silica with a metallocene. Any of the methods discussed in these references are useful for producing a supported activator component utilized in a catalyst composition controlled in accordance with some embodiments of the invention.

In other embodiments, a supported activator (e.g., supported alumoxane) is aged for a period of time prior to use (e.g., as described in U.S. Pat. Nos. 5,468,702 and 5,602,217).

In some embodiments, a supported activator is in a dried state (is a solid). In other embodiments, the supported activator is in a substantially dry state or a slurry (e.g., a mineral oil slurry).

In other embodiments, two or more separately supported activators are used, or alternatively, two or more different activators on a single support are used.

In other embodiments, the support material, preferably partially or totally dehydrated support material (e.g., 200° C. to 600° C. dehydrated silica), is contacted with an organoaluminum or alumoxane compound. In an embodiment where an organoaluminum compound is used, the activator is formed in situ on and in the support material as a result of the reaction of, for example, trimethylaluminum and water.

In another embodiment, Lewis base-containing supports are reacted with a Lewis acidic activator to form a support bonded Lewis acid compound (e.g., as described in U.S. Pat. No. 6,147,173. The Lewis base hydroxyl groups of silica are exemplary of metal/metalloid oxides where this method of bonding to a support occurs.

Other embodiments of supporting an activator are described in U.S. Pat. No. 5,427,991, where supported non-coordinating anions derived from trisperfluorophenyl boron are described; U.S. Pat. No. 5,643,847 discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Lewis acid catalysts suitable for carbocationic polymerizations are described in U.S. Pat. No. 5,288,677; and James C. W. Chien, Jour. Poly. Sci.: Pt A: Poly. Chem, Vol. 29, 1603-1607 (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In some embodiments, a supported activator is formed by preparing in an agitated, and temperature and pressure controlled vessel a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138 kPa). An inert gas sweep can also be used in assist in removing solvent. Alternate orders of addition, such as slurrying the support material in an appropriate solvent then adding the activator, can be used.

Spray Dried Catalyst Composition Components

In other embodiments, a support is combined with one or more activators and is spray dried to form a supported activator. For example, fumed silica is combined with methyl alumoxane and then spray dried to from supported methyl alumoxane. Preferably a support is combined with alumoxane, spray dried and then placed in mineral oil to form a slurry useful in some embodiments of the invention.

In other embodiments, one or more of the catalyst compounds described above have been combined with optional support material(s) and or optional activator(s) and spray dried prior to being combined with the slurry diluent.

In other embodiments, the catalyst compounds and/or the activators are combined with a support material such as a particulate filler material and then spray dried, e.g., to form a free flowing powder. Spray drying may be by any means known in the art (e.g., as described in EP A 0 668 295 B1, U.S. Pat. No. 5,674,795, and U.S. Pat. No. 5,672,669, which particularly describe spray drying of supported catalysts). In general one may spray dry the catalysts by placing the catalyst compound and the optional activator in solution (allowing the catalyst compound and activator to react, if desired), adding a filler material such as silica or fumed silica, such as Gasil™ or Cabosil™, then forcing the solution at high pressures through a nozzle. The solution may be sprayed onto a surface or sprayed such that the droplets dry in midair. The method generally employed is to disperse the silica in toluene, stir in the activator solution, and then stir in the catalyst compound solution. Typical slurry concentrations are about 5 to 8 wt %. This formulation may sit as a slurry for as long as 30 minutes with mild stirring or manual shaking to keep it as a suspension before spray-drying. In one preferred embodiment, the makeup of the dried material is about 40-50 wt % activator (preferably alumoxane), 50-60 $SiO_2$ and about ~2 wt % catalyst compound.

For simple catalyst compound mixtures, the two or more catalyst compounds can be added together in the desired ratio in the last step. In another embodiment, more complex procedures are possible, such as addition of a first catalyst compound to the activator/filler mixture for a specified reaction time t, followed by the addition of the second catalyst compound solution, mixed for another specified time x, after which the mixture is cosprayed. Lastly, another additive, such as 1-hexene in about 10 vol % can be present in the activator/filler mixture prior to the addition of the first metal catalyst compound.

In other embodiments binders are added to the mix. These can be added as a means of improving the particle morphology, i.e. narrowing the particle size distribution, lower porosity of the particles and allowing for a reduced quantity of alumoxane, which is acting as the 'binder'.

In other embodiments a solution of a metallocene compound and optional activator can be combined with a different slurried spray dried catalyst compound and then introduced into a reactor.

The spray dried particles are generally fed into the polymerization reactor as a mineral oil slurry. Solids concentrations in oil are about 10 to 30 weight %, preferably 15 to 25 weight %. In some embodiments, the spray dried particles can be from less than about 10 micrometers in size up to about 100 micrometers, compared to conventional supported catalysts which are about 50 micrometers. In a preferred embodiment the support has an average particle size of 1 to 50 microns, preferably 10 to 40 microns.

Catalyst Compositions

Typically, the catalyst composition whose activity is controlled in accordance with the invention comprises (or is produced by combining) at least one catalyst component in a catalyst component slurry and/or at least one catalyst component in a catalyst component solution. Herein, "slurry" denotes a suspension of a solid, where the solid may or may not be porous, in a liquid. The catalyst component slurry and the catalyst component solution may be combined to form the catalyst composition which is then introduced into a polymerization reactor.

Catalyst Component Slurry

In some embodiments, the slurry used to produce the catalyst or catalyst system (whose activity is controlled in accordance with typical embodiments of the invention for producing a bimodal polymer product) includes an activator and a support, or a supported activator. In other embodiments, the slurry is a catalyst components slurry that includes at least one catalyst compound in addition to the activator and the support and/or the supported activator. In some embodiments, the catalyst compound in the slurry is supported.

In other embodiments, the slurry includes one or more activator(s) and support(s) and/or supported activator(s) and/or one more catalyst compound(s). For example, the slurry may include two or more activators (such as a supported alumoxane and a modified alumoxane) and a catalyst compound, or the slurry may include a supported activator and more than one catalyst compounds. Preferably, the slurry comprises a supported activator and two catalyst compounds.

In other embodiments the slurry comprises supported activator and two different catalyst compounds, which may be added to the slurry separately or in combination.

In another embodiment the slurry, containing a supported alumoxane, is contacted with a catalyst compound, allowed to react, and thereafter the slurry is contacted with another catalyst compound. In another embodiment the slurry containing a supported alumoxane is contacted with two catalyst compounds at the same time, and allowed to react.

In other embodiments the molar ratio of metal in the activator to metal in the catalyst compound in the slurry is 1000:1 to 0.5:1, preferably 300:1 to 1:1, more preferably 150:1 to 1:1.

In other embodiments the slurry contains a support material which may be any inert particulate carrier material known in the art, including, but not limited to, silica, fumed silica, alumina, clay, talc or other support materials such as disclosed above. In a preferred embodiment, the slurry contains a supported activator, such as those disclosed above, preferably methyl alumoxane and/or modified methyl alumoxane on a support of silica.

The catalyst component slurry used in some embodiments of the invention is prepared by suspending the catalyst components, preferably the support, the activator and optional catalyst compounds in a liquid diluent. The liquid diluent is typically an alkane having from 3 to 60 carbon atoms, preferably having from 5 to 20 carbon atoms, preferably a branched alkane, or an organic composition such as mineral oil or silicone oil. The diluent employed is preferably liquid under the conditions of polymerization and relatively inert. The concentration of the components in the slurry is controlled such that a desired ratio of catalyst compound(s) to activator, and/or catalyst compound to catalyst compound is fed into the reactor.

Typically, the catalyst compound and the support and activator, or supported activator, and the slurry diluent are allowed to contact each other for a time sufficient for at least 50% of the catalyst compounds to be deposited into or on the support, preferably at least 70%, preferably at least 75%, preferably at least 80%, more preferably at least 90%, preferably at least 95%, preferably at least 99%. In an embodiment, the catalyst component slurry is prepared prior to its use. Times allowed for mixing are up to 10 hours, typically up to 6 hours, more typically 4 to 6 hours. In some embodiments, a catalyst compound is considered to be in or on the support if the concentration of the catalyst compound in the liquid portion of the slurry is reduced over time after adding the catalyst compound to the slurry. Concentration of the catalyst compound in the liquid diluent may be measured for example, by inductively coupled plasma spectroscopy (ICPS), or by ultraviolet (UV) spectroscopy, after standardization with a calibration curve prepared at the appropriate concentration range, as is known in the art. Thus for example, 70% of a catalyst compound will be considered to have deposited in or on a support if the concentration of the catalyst compound in the liquid (not including the support) is reduced by 70% from its initial concentration.

In one embodiment, the catalyst compounds can be added to the slurry as a solution, slurry, or powder. The catalyst component slurry is prepared prior to its use in the polymerization process of the invention or the catalyst component slurry may be prepared in-line.

In one embodiment, the slurry is prepared by combining the catalyst components, such as for example the catalyst or supported catalyst and the support and activator or supported activator, all at once. In another embodiment, the slurry is prepared by first adding a support material, then adding the combination of a catalyst and an activator component.

In another embodiment the slurry comprises a supported activator and at least one catalyst compound where the catalyst compound is combined with the slurry as a solution. A preferred solvent is mineral oil.

In a another embodiment, alumoxane, preferably methyl alumoxane or modified methyl alumoxane, is combined with a support such as calcined silica or fumed silica to form a supported activator, the supported activator is then dispersed in a liquid, such as degassed mineral oil, and then one or more catalyst compounds are added to the dispersion and mixed to form the catalyst component slurry. The catalyst compounds are preferably added to the dispersion as a solid, powder, solution or a slurry, preferably a slurry of mineral oil. If more than one catalyst compound is added to the dispersion, the catalyst compounds can be added sequentially, or at the same time.

In another embodiment the catalyst compound is added to the slurry in solid or powder form. In one embodiment, a Group 15 containing catalyst compound is added to the slurry in powder or solid form. In another embodiment, [(2,4,6-Me$_3$C$_6$H$_2$)NCH$_2$CH$_2$]$_2$NHZrBz$_2$ and or [(2,4,6-Me$_3$C$_6$H$_2$)NCH$_2$CH$_2$]$_2$NHHfBz$_2$ is added to the slurry as a powder.

In an embodiment the catalyst component slurry comprises mineral oil and has a viscosity of about 130 to about 2000 cP at 20° C., more preferably about 180 to about 1500 cP at 20° C. and even more preferably about 200 to about 800 cP at 20° C. as measured with a Brookfield model LVDV-III Rheometer housed in a nitrogen purged drybox (in such a manner that the atmosphere is substantially free of moisture and oxygen, i.e. less than several ppmv of each). The catalyst component slurries are made in a nitrogen purged drybox, and rolled in their closed glass containers until immediately before the viscosity measurements are made, in order to ensure that they are fully suspended at the start of the trial. Temperature of the viscometer is controlled via an external temperature bath circulating heat transfer fluid into the viscometer. The rheometer was fitted with the appropriate spindle for the test material as specified in the unit's application guide. Typically, a SC4-34 or SC4-25 spindle was used. Data analysis was performed using Rheocalc V1.1 software, copyright 1995, Brookfield Engineering Laboratories, preferably purchased and used with the unit.

In one embodiment, the catalyst component slurry comprises a supported activator and one or more or a combination of the catalyst compound(s) described in Formula I to IX above.

In another embodiment, the catalyst component slurry comprises a supported activator and one or more or a combination of the Group 15 catalyst compound(s) represented by Formula I or II described above.

In another embodiment, the catalyst component slurry comprises a supported activator and one or more or combination of the ligand catalyst compound(s) represented by Formula III to VI described above.

In another embodiment, the slurry comprises supported activator, a Group 15 catalyst compound(s) represented by Formula I or II described above, and a the ligand catalyst compound(s) represented by Formula III to VI In another embodiment, the slurry comprises supported alumoxane and [(2,4,6-Me$_3$C$_6$H$_2$)NCH$_2$CH$_2$]$_2$NH MBz$_2$ where M is a Group 4 metal, each Bz is a independently a benzyl group and Me is methyl.

In another embodiment, the slurry comprises a supported alumoxane, a Group 15 catalysts compound and one of the following: bis(n-propyl cyclopentadienyl)-MX$_2$, (pentamethylcyclopentadienyl)(n-propylcyclopentadienyl)MX$_2$, bis(indenyl)-MX$_2$, or (tetramethylcyclopentadienyl) (n-propyl cyclopentadienyl) MX$_2$, where M is zirconium, hafnium or titanium and X is chlorine, bromine, or fluorine.

To produce the catalyst or catalyst system (whose activity is controlled in accordance with typical embodiments of the invention for producing a bimodal polymer product), any of the described catalyst component containing slurries may be combined with any of the described catalyst component containing solutions. More than one catalyst component containing slurry may be utilized.

Catalyst Component Solution

The catalyst composition solution that may be used to produce a catalyst composition (whose activity is controlled in accordance with typical embodiments of the invention for producing a bimodal polymer product) may include at least one catalyst compound, or an activator and at least one catalyst compound.

In some embodiments, the catalyst component solution used in the inventive method is prepared by dissolving a catalyst compound and optional activators in a liquid solvent. The liquid solvent is typically an alkane, such as a C$_5$ to C$_{30}$ alkane, preferably a C$_5$ to C$_{10}$ alkane. Cyclic alkanes such as cyclohexane and aromatic compounds such as toluene may also be used. In addition, mineral oil may be used as a solvent. The solution employed should be liquid under the conditions of polymerization and relatively inert. In one embodiment, the liquid utilized in the catalyst compound solution is different from the diluent used in the catalyst component slurry. In other embodiments, the liquid utilized in the catalyst compound solution is the same as the diluent used in the catalyst component solution.

In some embodiments, the ratio of metal in the activator to metal in the catalyst compound in the solution is 1000:1 to 0.5:1, preferably 300:1 to 1:1, more preferably 150:1 to 1:1.

In some embodiments, the activator and catalyst compound are present in the solution at up to about 90 wt %, preferably at up to about 50 wt %, preferably at up to about 20 wt %, preferably at up to about 10 wt %, more preferably at up to about 5 wt %, more preferably at less than 1 wt %, more preferably between 100 ppm and 1 wt % based upon the weight of the solvent and the activator or catalyst compound.

In some embodiments, the catalyst component solution comprises any one of the catalyst compounds described in Formula I to IX above.

In other embodiments, the catalyst component solution comprises a Group 15 catalyst compound represented by Formula I or II described above.

In other embodiments, the catalyst component solution comprises a ligand catalyst compound represented by Formula III to VI described above.

In some embodiments, the solution comprises bis(n-propyl cyclopentadienyl)-MX$_2$, (pentamethylcyclopentadienyl)(n-propylcyclopentadienyl)MX$_2$, bis(indenyl)-MX$_2$, (tetramethylcyclopentadienyl) (n-propylcyclopentadienyl) MX$_2$, where M is a Group 4 metal, preferably zirconium, hafnium or titanium and X is chlorine, bromine, or fluorine.

Catalyst Compositions

To produce a catalyst composition (whose activity is controlled in accordance with typical embodiments of the invention for producing a bimodal polymer product), one or more of the catalyst component containing solutions describe herein may be combined with one or more of the catalyst component containing slurries. Generally, the catalyst component slurry and the catalyst component solution are mixed in the process of the invention to form the final catalyst composition, which is then introduced into a polymerization reactor and combined with and one or more olefins. More than one catalyst component containing solution may be utilized.

In one embodiment, the slurry contains at least one support and at least one activator, preferably a supported activator, and the solution contains at least one catalyst compound. In another embodiment, the catalyst component slurry contains a support, and an activator and/or a supported activator, and the catalyst component solution contains at least one catalyst compound and at least one activator.

In one embodiment, the slurry contains at least one support and at least one activator, preferably a supported activator, and the solution contains one or more catalyst compound(s) and/or one or more activator compound(s).

In other embodiments, the catalyst component slurry contains more than one support(s), activator(s) and/or supported activator(s), and the catalyst component solution contains at least one catalyst compound and/or at least one activator.

In other embodiments, the catalyst component slurry contains a support, an activator and/or a supported activator, and also contains a catalyst compound and/or a supported catalyst compound, and the catalyst component solution contains one or more catalyst compound(s) and/or at least one activator.

In other embodiments, the catalyst component slurry contains more than one support(s), activator(s) and/or supported activators and more than one catalyst compound(s) and/or supported catalyst compound(s), and the catalyst component solution contains at least one catalyst compound and/or at least one activator.

In one embodiment the catalyst composition, formed by combining the catalyst component slurry and the catalyst component solution, has a viscosity of about 130 to about 2000 cP at 20° C., more preferably about 180 to about 1500 cP at 20° C. even more preferably about 200 to about 800 cP at 20° C.

In another embodiment, the catalyst component solution comprises, up to 80 weight %, preferably up to 50 weight %, preferably up to 20 weight %, preferably up to 15 weight %, more preferably between 1 to 10 weight %, more preferably 3 to 8 weight % of the combination of the catalyst component solution and the catalyst component slurry, based upon the weight of the solution and the slurry. In another preferred embodiment, the catalyst component solution comprises mineral oil and comprises up to 90 weight %, preferably up to 80 weight %, more preferably between 1 to 50 weight %, and more preferably 1 to 20 weight % of the combination of the catalyst component solution and the catalyst component slurry, based upon the weight of the solution and the slurry.

In some embodiments, the catalyst component slurry (or catalyst composition) is fed to the polymerization reactor using a slurry feeder (e.g., a slurry feeder described U.S. Pat. No. 5,674,795).

In one embodiment, the catalyst component solution, comprising a catalyst compound, is contacted with the catalyst component slurry so that at least 50% of the catalyst compound originally in the catalyst component solution is deposited in or on the support, preferably at least 70%, preferably at least 75%, preferably at least 80%, more preferably at least 90%, preferably at least 95%, preferably at least 99%.

In another embodiment, the catalyst component solution comprising a metallocene catalyst compound, is contacted with a catalyst component slurry comprising a support and an activator, preferably a supported activator, to form an immobilized catalyst composition. After contacting, all or substantially all, preferably at least 50% preferably at least 70%, preferably at least 75%, preferably at least 80%, more preferably at least 90%, preferably at least 95%, preferably at least 99% of the catalyst compound from the catalyst component solution is deposited in or on the support initially contained in the catalyst component slurry. In one embodiment, a catalyst compound will be considered to be in or on the support if the concentration of the catalyst compound in the liquid portion of the combination is reduced over time after adding the catalyst compound from the solution.

In another embodiment, the supported activator is in a mineral oil that is then contacted with a metallocene catalyst solution prior to introducing the catalyst composition to the reactor, preferably where the contacting takes place in-line.

In another embodiment, the catalyst composition system or components thereof may be contacted with a carboxylate metal salt as described in PCT publication WO 00/02930 and WO 00/02931.

In another embodiment the solution comprises a catalyst compound and the slurry comprises a supported activator, such as supported alumoxane, and two or more catalyst compounds, that may be the same or different from the catalyst compound in the solution. The two catalyst compounds may be added to the slurry before or after the supported activator. In a preferred embodiment the supported activator is added to the liquid diluent first to form a slurry, then a catalyst compound is added to the slurry, and thereafter another catalyst compound is added to the slurry. The second catalyst is preferably added after the first catalyst compound and the supported activator have been contacted for at least 1 minute, preferably at least 15 minutes, more preferably at least 30 minutes, more preferably at least 60 minutes, more preferably at least 120 minutes, more preferably at least 360 minutes.

In another embodiment two catalyst compounds are added to the slurry at the same time, in the same or different solutions. In another embodiment, a catalyst compound is contacted with an unsupported activator prior to being placed in the slurry. In a preferred embodiment, the unsupported activator is a modified or unmodified alumoxane, such as methyl alumoxane.

In another embodiment, a catalyst compound is added to the solution or slurry in its constituent parts of metal compound and ligands. For example, cyclopentadienyl groups such as substituted or unsubstituted cyclopentadiene, indene, fluorene groups and metal compounds such as zirconium tetrahalide may be added to the slurry or solution or both and allowed to react therein. Likewise, one may also add metal compounds and or ligands to the solution and or slurry that already contains catalyst compounds. The metal compounds and ligands may be the same or different from the components of the catalyst compound in the solution or slurry. In another embodiment ligands and/or metal compounds may be added to both the solution and the slurry.

In another embodiment the catalyst composition comprises a "bisamide" catalyst compound (i.e., a bridged bis (arylamido) Group 4 compounds described by D. H. McConville, et al., in Organometallics 1195, 14, 5478-5480, or a bridged bis(amido) catalyst compounds described in WO 96/27439) combined with an activator, spray dried to a powder state, then combined with mineral oil to form a slurry. This combination may then be combined with various catalyst component solutions to form a particularly effective multiple catalyst system. Preferred catalyst compounds include those described above as metallocene catalysts. In another preferred embodiment the slurry comprises a supported activator and the solution comprises a catalyst compound. The catalyst compounds may be selected from various catalyst compounds described above including metallocenes.

In another embodiment, the catalyst component slurry comprises $[(2,4,6\text{-Me}_3C_6H_2)\text{ NCH}_2\text{CH}_2]_2\text{NHZrBz}_2$ or $[(2,4,6\text{-Me}_3C_6H_2)\text{NCH}_2\text{CH}_2]_2\text{NHHfB}_2$, where each Bz is independently a benzyl group, Me is methyl, and the solution comprises bis(n-propyl cyclopentadienyl)-$MX_2$, (pentamethylcyclopentadienyl)(n-propylcyclopentadienyl)$MX_2$, bis(indenyl)-$MX_2$, or (tetramethylcyclopentadienyl) (n-propylcyclopentadienyl) $MX_2$, where M is zirconium, hafnium or titanium and X is chlorine, bromine, or fluorine.

In another embodiment, the catalyst component solution comprises $[(2,4,6\text{Me}_3C_6H_2)\text{ NCH}_2\text{CH}_2]_2\text{NHZrBz}_2$ or $[(2,4,6\text{-Me}_3C_6H_2)\text{NCH}_2\text{CH}_2]_2\text{NHHfB}_2$, where each Bz is independently a benzyl group, Me is methyl, and the slurry comprises: 1) supported alumoxane, and 2) bis(n-propyl cyclopentadienyl)-MX$_2$, pentamethylcyclopentadienyl)(n-propylcyclopentadienyl)MX$_2$, bis(indenyl)-MX$_2$, or (tetramethylcyclopentadienyl) (n-propylcyclopentadienyl) MX$_2$, where M is zirconium, hafnium or titanium and X is chlorine, bromine, or fluorine.

In another embodiment, the catalyst component slurry comprises: 1) a supported alumoxane, 2) bis(n-propyl cyclopentadienyl)-MX$_2$, (pentamethylcyclopentadienyl)(n-propyl-cyclopentadienyl)MX$_2$, bis(indenyl)-MX$_2$, (tetramethylcyclopentadienyl) (n-propylcyclopentadienyl) MX$_2$, where M is zirconium, hafnium or titanium and X is chlorine, bromine, or fluorine, and 3) [(2,4,6-Me$_3$C$_6$H$_2$)NCH$_2$CH$_2$]$_2$NHZrBz$_2$ or [(2,4,6-Me$_3$C$_6$H$_2$)NCH$_2$CH$_2$]$_2$NHHfBz$_2$, and the solution comprises a metallocene compound.

In another embodiment, the catalyst component slurry comprises mineral oil and a spray dried catalyst compound. In another embodiment, the spray dried catalyst compound is a Group 15 containing metal compound. In a preferred embodiment, the spray dried catalyst compound comprises [(2,4,6-Me$_3$C$_6$H$_2$)NCH$_2$CH$_2$]$_2$NHZrBz$_2$.

In another embodiment, the catalyst compound and the supported activator may be combined before being combined with the slurry diluent or after.

In another embodiment the catalyst component solution comprises a catalyst compound of bis-indenyl zirconium dichloride, bis(n-propyl cyclopentadienyl) zirconium dichloride, (pentamethylcyclopentadienyl)(n-propylcyclopentadienyl)zirconium dichloride, (tetamethylcyclopentadienyl)(n-propylcyclopentadienyl)zirconium dichloride, or a mixture thereof.

In another embodiment, a first catalyst compound is combined with a supported activator in the slurry, and a second catalyst compound and an activator are combined in the solution and thereafter the two are mixed in line. In another embodiment, the one activator is an alumoxane and the other activator is a boron based activator.

In another embodiment the catalyst component slurry comprises mineral oil, spray dried [(2,4,6-Me$_3$C$_6$H$_2$)NCH$_2$CH$_2$]$_2$NHZrBz$_2$, and the solution comprises bis(n-propyl cyclopentadienyl) zirconium dichloride.

In an embodiment, the catalyst component slurry comprises supported activator and a catalyst compound and the solution comprises a catalyst compound different in some way from the catalyst compound in the slurry. For example, the slurry catalyst compound could be a compound represented by the Formula I or II described above, while the solution catalyst compound could be a catalyst compound described by Formula III, IV, V, VI, or VII, or vice versa.

In some embodiments for producing a bimodal polymer product, the catalyst composition includes a first catalyst compound mixed with an activator in the slurry, to which is added (on-line) a solution of a different catalyst compound that is capable of being activated by the same activator. Since the two catalyst compounds are introduced into the feed line independently, it is easier to control the amount of the LMW and HMW fractions of the bimodal product, assuming that each catalyst produces at least one fraction (species) of polymer.

In preferred embodiments for producing a bimodal polymer product, a Group 15 metal containing catalyst compound and a metallocene catalyst compound are combined (e.g., with supported alumoxane), and activity of the resulting catalyst composition is controlled in accordance with the invention. Typically the two catalyst compounds are combined in a slurry with the supported alumoxane and the slurry is combined with a trim solution of one or the other of the two catalyst compounds.

In other embodiments for producing a bimodal polymer product, [(2,4,6-Me$_3$C$_6$H$_2$)NCH$_2$CH$_2$]$_2$NHHfBz$_2$, and bis(n-propyl cyclopentadienyl) zirconium dichloride, where "Bz" denotes benzyl, are combined (e.g., with supported methyl alumoxane) to form a bimodal catalyst system, and activity of the resulting catalyst system is controlled in accordance with the invention. Typically the two catalyst compounds are combined in a slurry with the supported alumoxane and the slurry is combined with a trim solution comprise one or the other of the two catalyst compounds. The product formed in the reactor is regulated by varying the amount of trim solution combined with the slurry on-line (i.e., the mixed is trimmed). In one embodiment this catalyst combination is then used to polymerize olefin(s), preferably ethylene, at a polymerization temperature of 80 to 110° C.

In some embodiments, the catalyst component slurry concentration is maintained at greater than 0 to 90 wt % solids, more preferably 1 to 50 wt %, more preferably 5 to 40 wt %, even more preferably 10 to 30 wt %, based upon the weight of the slurry. In another preferred embodiment the activator is present on the support at between about 0.5 to about 7 mmol/g, preferably about 2 to about 6 mmol/g, more preferably between about 4 to about 5 mmol/g. In another preferred embodiment the total amount of catalyst compound present on the support, preferably a supported activator, is about 1 to about 40 µmol/g, preferably about 10 to about 38 µmol/g, more preferably 30 to 36 µmol/g.

In one embodiment the final mole ratio (i.e. after combination of the solution and the slurry) of the metal of the catalyst compounds and the metal of the activator is in the range of from about 1000:1 to about 0.5:1 preferably from about 300:1 to about 1:1 more preferably from about 150:1 to about 1:1; for boranes, borates, aluminates, etc., the ratio is preferably about 1:1 to about 10:1 and for alkyl aluminum compounds (such as diethylaluminum chloride combined with water) the ratio is preferably about 0.5:1 to about 10:1.

In one embodiment, the catalyst compound used in the slurry is not soluble in the solvent used in the solution. By "not soluble" is meant that the not more than 5 weight % of the material dissolves into the solvent at 20° C. and less than 3 minutes of stirring, preferably not more than 1 weight %, preferably not more than 0.1 weight %, preferably not more than 0.01 weight %. In a preferred embodiment, the catalyst compound used in the slurry at least only sparingly soluble in an aromatic hydrocarbon. In a preferred embodiment the catalyst compound used in the slurry is not soluble in mineral oil, aromatic solvent or aliphatic hydrocarbon (e.g., pentane or heptane).

Delivery of the Catalyst Compositions

In a class of embodiments of the inventive method, a catalyst component slurry is combined with and/or reacted with a catalyst component solution to form a catalyst composition in-line. The resulting catalyst composition is then introduced into a polymerization reactor and activity of the catalyst composition is controlled in accordance with the invention. Typically, the catalyst composition is introduced to the reactor utilizing a catalyst feed system which includes a catalyst component slurry holding vessel, a catalyst component solution holding vessel, and a slurry feeder.

We next describe embodiments in this class with reference to FIG. 1. In operation of the FIG. 1 system, a catalyst component slurry (e.g., a mineral oil slurry including at least one support and at least one activator, preferably at least one supported activator, and optionally at least one catalyst compound) is placed in vessel A. In a preferred embodiment, vessel A is an agitated holding tank designed to keep the solids concentration homogenous. The catalyst component solution is prepared by mixing a solvent and at least one catalyst compound and/or activator and the solution is placed in vessel C. The catalyst component slurry is then combined in-line with the catalyst component solution to form a final catalyst composition. A nucleating agent, such as silica, alumina, fumed silica or any other particulate matter (B) may be added to the slurry and/or the solution in-line or in vessel A or C. Similarly, additional activators or catalyst compounds may be added in-line. The catalyst component slurry and solution are preferably mixed in-line at some point (E) for a period of time. For example, the solution and slurry may be mixed by utilizing a static mixer or an agitating vessel. The mixing of the catalyst component slurry and catalyst component solution should be long enough to allow the catalyst compound in the catalyst component solution to disperse in the catalyst component slurry such that the catalyst component, originally in the solution, migrates to the supported activator originally present in the slurry. The combination thereby becomes a uniform dispersion of catalyst compounds on the supported activator forming the catalyst composition. The length of time that the slurry and the solution are contacted is typically up to about 120 minutes, preferably about 1 to about 60 minutes, and more preferably about 3 or 4 minutes to about 40 minutes.

In another embodiment, at least one of an aluminum alkyl, an ethoxylated aluminum alkyl, an alumoxane, an antistatic agent, and a borate activator (e.g., a $C_1$ to $C_{15}$ alkyl aluminum (for example tri-isobutyl aluminum, trimethyl aluminum or the like), a $C_1$ to $C_{15}$ ethoxylated alkyl aluminum or methyl alumoxane, ethyl alumoxane, isobutylalumoxane, and/or modified alumoxane) is added to a mixture of catalyst slurry and catalyst solution in line. The stream ("F" in FIG. 1) of alkyl(s), antistatic agents, borate activator(s) and/or alumoxane(s) may be added directly to the combination of the solution and slurry, or may be added via a stream ("G" in FIG. 1) of at least one induced condensing agent ("ICA"). Stream G may be or include isopentane, hexane, heptane, and/or octane or another alkane, or another ICA (isopentane and/or hexane are preferred in some applications). Preferably, the additional alkyls, antistatic agents, borate activators and/or alumoxanes are present at up to about 500 ppm, more preferably at about 1 to about 300 ppm, more preferably at 10 to about 300 ppm, more preferably at about 10 to about 100 ppm. The ICA stream (G) is typically added to the mixture of the catalyst slurry and catalyst solution at a rate of about 0.5 lb/hr to about 60 lbs/hr (27 kg/hr). The ICA feed rate is preferably controlled in accordance with the invention. The ICA (and optionally also any antistatic agents to be added) can alternatively be added directly to the reactor or the recycle line, without contacting the catalyst before entering the reactor.

A stream of carrier gas H (e.g., nitrogen, argon, ethane, or propane, or another gas) may also be added in-line to the mixture of catalyst slurry and solution. Typically the carrier gas is added at the rate of about 1 lb/hr to about 100 lb/hr (0.4 to 45 kg/hr), preferably about 1 to about 50 lb/hr (5 to 23 kg/hr), more preferably about 1 to about 25 lb/hr (0.4 to 11 kg/hr).

Optionally, a liquid carrier stream is introduced into a combination of catalyst solution and slurry that is moving in a downward direction. The mixture of the solution, the slurry and the liquid carrier stream may pass through an optional mixer or length of tube for mixing before being contacted with a gaseous carrier stream.

Optionally, a stream ("J" in FIG. 1) of hexene (or other alpha-olefin or diolefin) is added in-line to the mixture of catalyst slurry and solution.

The catalyst slurry/solution mixture (with each other substance added in-line thereto) is preferably passed through an injection tube (O) into reactor Q. In some embodiments, injection tube O aerosolizes the slurry/solution mixture. In some preferred embodiments, injection tube O has a diameter of about 1/16 inch to about 1/2 inch (0.16 cm to 1.27 cm), preferably about 3/16 inch to about 3/8 inch (0.5 cm to 0.9 cm), more preferably 1/4 inch to about 3/8ths inch (0.6 cm to 0.9 cm).

In some implementations, cycle gas (also called re-cycle gas) and monomer gas (e.g., ethylene gas) are introduced into reactor Q via support tube S. At least one nucleating agent K (e.g., fumed silica) can be added directly into reactor Q.

In some implementations, reactor Q is a fluidized bed gas-phase reactor and a plenum is used to create a particle lean zone in reactor Q (e.g., as described in U.S. Pat. No. 5,693,727) during polymerization. The plenum may have one, two, or more injection nozzles.

In some implementations in which reactor Q is a gas-phase reactor, and a metallocene catalyst or other similar catalyst is used in the reactor, at least one of oxygen and fluorobenzene is added to the reactor directly or to the recycle gas to affect the polymerization rate. Thus, when a metallocene catalyst (which is sensitive to oxygen or fluorobenzene) is used in combination with another catalyst (that is not sensitive to oxygen) in a gas phase reactor, oxygen can be used to modify the metallocene polymerization rate relative to the polymerization rate of the other catalyst. An example of such a catalyst combination is bis(n-propyl cyclopentadienyl) zirconium dichloride and $[(2,4,6-Me_3C_6H_2)NCH_2CH_2]_2NHZrBz_2$, where Me is methyl, or bis(indenyl) zirconium dichloride and $[(2,4,6-Me_3C_6H_2)NCH_2CH_2]_2NHHfBz_2$, where Me is methyl. For example if the oxygen concentration in the nitrogen feed is altered from 0.1 ppm to 0.5 ppm, significantly less polymer from the bisindenyl $ZrCl_2$ will be produced and the relative amount of polymer produced from the $[(2,4,6-Me_3C_6H_2)NCH_2CH_2]_2NHHfBz_2$ is increased. WO/09328 discloses the addition of water and or carbon dioxide to gas phase polymerization reactors.

In another implementation of the FIG. 1 system, a slurry comprising mineral oil, at least one catalyst compound, a support and an activator is mixed in and/or introduced from vessel A. A catalyst component solution comprising a solvent, such as toluene, hexane, mineral oil or tetrahydrofuran, and a catalyst compound and/or an activator is mixed in and/or introduced from vessel C. Nucleating agent (B) and (K), such as fumed silica, may be added on line at one or more positions and may be wet or dry. The slurry and the solution are combined and typically mixed at location E. Optional light alkyls (F), such as triisobutyl aluminum, an alumoxane, modified methylalumoxane and/or trimethyl aluminum, may be added in line directly to the combination or via an ICA feed G (the ICA may be isopentane). Nitrogen H and/or olefin (e.g., hexene) J may also be added in line. The combination is then injected through injection tube O (e.g., having 1/8 inch, or 0.3 cm, diameter) into gas phase reactor Q. Injection tube O may be supported inside a larger support tube S (which may have 1 inch, or 2.54 cm, diameter). Oxygen can be added directly to reactor Q or to recycle gas stream P to alter the activity of one or more catalysts. Gas flow R (e.g., a flow of monomer, recycle gas, and/or alkane) enters reactor Q via support tube S.

In one implementation, catalyst ball formation and or general nozzle fouling are reduced by first feeding a stream (G) of isopentane carrier into the combination of the solution and slurry, so that the combination of the solution, slurry, and isopentane thereafter flows vertically into the reactor using a nitrogen sweep (H) to disperse the isopentane/slurry mixture into the reactor.

Typically, catalyst injection tube O passes into reactor Q through a compressed chevron packing and extends into the fluid bed a distance of about 0.1 inch to 10 feet (0.25 cm to 3.1 m), preferably about 1 inch to 6 ft (2.5 cm to 1.8 m), and more preferably about 2 inches to 5 feet (5 cm to 1.5 m). Typically, the depth of insertion depends on the diameter of the reactor and typically extends in about 1/20 to 1/2 of the reactor diameter, preferably about 1/10th to 1/2 and more preferably about 1/5th to 1/3rd of the reactor diameter. The end of the tube may be cut perpendicular to the axis to create a nozzle cone or point with an angle ranging from 0 to 90 degrees, preferably ranging from about 10 to 80 degrees. The lip of the hole can be taken to a new knife-edge. The tube can be positioned to reduce resin adhesion or coated with an antifouling or antistatic compound. The tube can also be cut diagonally at an angle simply from about 0 to 80 degrees off the axial line of the tube, preferably about 0 to 60 degrees. The opening of the tube can be the same as the bore of the tube or expanded or diminished to create a nozzle, with sufficient pressure drop and geometry to provide a dispersed spray of a solution slurry and or powder into the reactor, preferably into the fluid bed.

Injection tube O is optionally supported inside a structure within the fluid bed to provide structural integrity. This support tube is typically a heavy walled pipe with an internal diameter of from about 1/4 inch to about 5 inches (0.64 cm to 12.7 cm), preferably about 1/2 inch to about 3 inches (1.3 cm to 7.6 cm), and more preferably about 3/4 inch to about 2 inches (1.9 cm to 5 cm). The support tube preferably extends through the reactor wall to approximately the length of the injection tube, allowing the injection tube to end just inside the end of the support tube or to extend past it up to about 10 inches (25.4 cm). Preferably, the injection tube extends about 0.5 to 5 inches (1.8 cm to 12.7 cm) beyond the end of the support tube and more preferably about 1 to 3 inches (2.5 cm to 7.6 cm). The end of the support tube in the reactor may be cut flat and perpendicular to the axis of the tube or preferably, may be tapered at an angle ranging from about 10 to 80 degrees. The end of the support tube may be polished or coated with an anti-static or anti-fouling material.

A purge flow (R) of fluid (e.g., fresh monomer, ethylene, hexane, isopentane, recycle gas, or another gas) is preferably introduced from outside the reactor down support tube S to aid in dispersion of the catalyst composition allowing the production of resin granular particles of good morphology with decreased agglomeration and an APS (average particle size) in the range of about 0.005 to 0.10 inches (0.01 cm to 0.3 cm). The purge flow of fluid helps minimize fouling of the end of the catalyst injection tube and support tubes. The fluid introduced to the support tube may comprise hydrogen; olefins or diolefins, including but not limited to $C_2$ to $C_{40}$ alpha olefins and $C_2$ to $C_{40}$ diolefins, ethylene, propylene, butene, hexene, octene, norbornene, pentene, hexadiene, pentadiene, isobutylene, octadiene, cyclopentadiene, comonomer being used in the polymerization reaction, hydrogen; alkanes, such $C_1$ to $C_{40}$ alkanes, including but not limited to isopentane, hexane, ethane, propane, butane, and the like; mineral oil, cycle gas with or without condensed liquids; or any combination thereof. Preferably the support tube flow is fresh ethylene or propylene that may be heated. In addition, an alkane, such as for instance isopentane or hexane, can be included in the flow at the level ranging from about 0.001 wt %. to about 50% of the flow. The alkane can be dispersed in the flow and may exist as dispersed liquid droplets or be vaporized at the exit of the support tube. The presence of liquid may reduce fouling at the exit.

The flow rate of fluid in the support tube ranges from about 5 to 10,000 pph and is somewhat dependent upon the reactor size. The linear velocity of the fluid in the support tube ranges from about 10 to 500 ft/sec (11 to 549 km/hr), preferably about 20 to 300 ft/sec (22 to 329 km/hr) and more preferably about 30 to 200 ft/sec (33 to 219 km/hr).

Alternatively, the exit of the support tube may be fashioned as a nozzle at the end to form a jet or dispersion of gas to aid in the distribution of the catalyst composition. In one embodiment, the internal diameter of the support tube is reduced gradually by about 3 to 80% at the end, preferably about 5 to 50% in a taper to create a nozzle to accelerate to and or disperse the fluid flow. The insertion of the injection tube is not impacted by the internal taper of the support tube.

In some implementations of the FIG. 1 system, the contact time of the catalyst slurry and solution is varied to adjust or control formation of the active catalyst complex.

In some implementations, the contact temperature of the slurry and solution is in the range of from 0° C. to about 80° C., preferably from about 0° C. to about 60° C., more preferably from about 10° C. to about 50° C. and most preferably from about 20° C. to about 40° C.

In some implementations, an immobilized catalyst system is introduced in the presence of a mineral oil or a surface modifier or a combination thereof (e.g., as described in PCT publication WO 96/11960 and U.S. Ser. No. 09/113,261 filed Jul. 10, 1998). In other implementations, a slurry or surface modifier (T), which may be an aluminum stearate in mineral oil, is introduced into reactor Q with the combination of the slurry and solution. In other implementations, a surface modifier, which may be aluminum stearate, is added into slurry vessel A.

In other implementations, one or all of the catalysts are combined with up to 6 weight % of a metal stearate, (preferably an aluminum stearate, more preferably aluminum distearate) or an anti-static agent based upon the weight of the catalyst, any support and the stearate or anti-static agent, preferably 2 to 3 weight %. In some implementations, a solution or slurry of the metal stearate or anti-static agent is fed into the reactor. The stearate or anti-static agent may be combined with the slurry in vessel A or with the solution in vessel C or may be co-fed (R) with the combination of the slurry and solution. In a preferred implementation the catalyst compounds and or activators are combined with about 0.5 to about 4 weight % of an antistat, such as a methoxylated amine, such as Witco's Kemamine AS-990 from ICI Specialties in Bloomington Del.

In other implementations, a catalyst system or components thereof are combined with benzil, xylitol, Irganox™ 565, sorbitol or the like and then fed into the reactor. These agents may be combined with the catalyst compounds and/or activators or may be fed into the reactor in a solution with or without the catalyst system or its components. Or, these agents may be combined with the slurry in vessel A or with the solution in vessel C or may be co-fed (R) with the combination of the slurry and solution.

In other embodiments, additional solutions and slurries may be introduced into the reactor during polymerization. For example, in one embodiment, a catalyst component slurry is combined with two or more catalyst solutions including the same or different catalyst compounds and/or activators. Or, a catalyst solution may be combined with two or more catalyst component slurries each having the same or different supports, and the same or different catalyst compounds and/or activators. Similarly, another embodiment uses two or more catalyst component slurries combined with two or more catalyst solutions, preferably in-line, where the slurries each comprise the same or different supports and may comprise the same or different catalyst compounds and/or activators and the solutions comprise the same or different catalyst compounds and/or activators. For example, the slurry may contain a supported activator and two different catalyst compounds, and two solutions, each containing one of the catalysts in the slurry, are each independently combined in-line with the slurry.

Polymerization Process

Control of the activity of a catalyst composition in accordance with the invention can be performed during any of a variety of gas phase polymerization reactions, proceeding over any of a wide range of temperatures and pressures. Particularly preferred are embodiments in which activity of a catalyst composition is controlled during gas phase polymerization which produce a bimodal polyethylene (or other bimodal polyethylene) product.

In some embodiments, the gas phase polymerization process polymerizes one or more olefin monomers having from 2 to 30 carbon atoms, preferably 2 to 12 carbon atoms, and more preferably 2 to 8 carbon atoms (e.g., polymerization of two or more olefin monomers of ethylene, propylene, butene-1, pentene-1,4-methyl-pentene-1, hexene-1, octene-1 and decene-1).

Other monomers useful in some embodiments of the inventive polymerization process include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In a preferred embodiment a copolymer of ethylene is produced, where with ethylene, a comonomer having at least one alpha-olefin having from 3 to 15 carbon atoms, preferably from 4 to 12 carbon atoms, and most preferably from 4 to 8 carbon atoms, is polymerized in a gas phase process.

In another embodiment, ethylene or propylene is polymerized with at least two different comonomers, optionally one of which may be a diene, to form a terpolymer.

In some embodiments, the mole ratio of comonomer to ethylene, $C_x/C_2$, where $C_x$ is the amount of comonomer and $C_2$ is the amount of ethylene is between about 0.0005 to 0.200 (and more preferably, between about 0.002 to 0.008, except where the product is intended for blow-molding use). With butene as the comonomer, the preferred mole ratio of comonomer to ethylene is typically higher (e.g., a typical value of the ratio is 0.02).

In a class of embodiments, the inventive polymerization process is a gas phase process for polymerizing propylene alone or with one or more other monomers including ethylene, and/or other olefins having from 4 to 12 carbon atoms. Polypropylene polymers may be produced using the particularly bridged metallocene catalysts as described in U.S. Pat. Nos. 5,296,434 and 5,278,264.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other embodiments of gas phase polymerization processes controllable in accordance with the invention are series or multistage polymerization processes, or gas phase processes of the type described in any of U.S. Pat. Nos. 5,627,242, 5,665,818, and 5,677,375, and European patent publications EP-A-0 794 200, EP-B1-0 649 992, EP-A-0 802 202 and EP-B-634 421.

In preferred embodiments, a polymerization reaction controlled in accordance with the invention produces bimodal polymer at a rate in the range from about 500 lbs of polymer per hour (227 Kg/hr) to about 200,000 lbs/hr (90,900 Kg/hr), and preferably not less than about 65,000 lbs/hr.

In a class of embodiments, a gas phase process is performed in the presence of a metallocene catalyst system and in the absence of or essentially free of any scavengers, such as triethylaluminum, trimethylaluminum, tri-isobutylaluminum and tri-n-hexylaluminum and diethyl aluminum chloride, dibutyl zinc and the like. Such a process is described in PCT publication WO 96/08520 and U.S. Pat. Nos. 5,712,352 and 5,763,543.

In some embodiments, olefin(s), preferably $C_2$ to $C_{30}$ olefin(s) or alpha-olefin(s), preferably ethylene or propylene or combinations thereof are prepolymerized in the presence of metallocene catalyst systems whose activity is controlled in accordance with the invention. The prepolymerization can be carried out batchwise or continuously, and can take place with any olefin monomer or combination and/or in the presence of any molecular weight controlling agent such as hydrogen.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, multimodal or bimodal high molecular weight polyethylenes, polypropylene and polypropylene copolymers.

The polymers, typically ethylene based polymers, have a density in the range of from 0.86 g/cc to 0.97 g/cc, depending on the desired use. For some applications a density in the range of from 0.88 g/cc to 0.920 g/cc is preferred while in other applications, such as pipe, film and blow molding, a density in the range of from 0.930 g/cc to 0.965 g/cc is preferred. For low density polymers, such as for film applications, a density of 0.910 g/cc to 0.940 g/cc is preferred. Density is measured in accordance with ASTM-D-1238.

The polymers produced by the process of the invention typically have a molecular weight distribution (the above-defined polydispersity index $M_w/M_n$) in a range from about 1.5 to about 70. In some embodiments the polymer produced has a narrow $M_w/M_n$ of about 1.5 to 15. In other embodiments the polymer produced has an $M_w/M_n$ of about 30 to 50. Polymers produced in accordance with the invention may have a narrow or broad composition distribution as measured by the well-known Composition Distribution Breadth Index (CDBI).

Polymers produced in accordance with typical embodiments of the invention have a bimodal molecular weight distribution. One embodiment produces a bimodal polymer having the following characteristics: a density of 0.93 to 0.96 g/cc, a melt index MI ($I_2$) of 0.03-0.10 g/10 min, a flow index ($I_{21}$) of 4-12 g/10 min, a melt flow ratio ("MFR," which is equal to $I_{21}/I_2$) of 80-180, an overall $M_w$ of 200,000 to 400,000, an overall $M_n$ of 5,000-10,000, and an overall $M_w/M_n$ of 20-50. Preferably the polymer has a low molecular weight fraction (having average molecular weight in the range ~500-~50,000) with a density of 0.935-0.975 g/cc and a high molecular weight fraction (having average molecular weight in the range ~50,000-~8,000,000) with a density of 0.910-0.950 g/cc. Such preferred bimodal polymer is particularly useful for film and pipe applications, especially, for PE-100 pipe applications. Preferably, the polymer has the following molecular weight distribution (MWD) characteristics. The MWDs, as obtained from size exclusion chromatography (SEC), can be deconvoluted using a bimodal fitting program. The preferred split of the polymer, the ratio of Wt % of an HMW (high molecular weight) fraction and the Wt % of an LMW (low molecular weight) fraction, is 20-80 to 80-20, more preferably 30-70 to 70-30, and even more preferably 40-60 to 60-40. Higher Wt % of HMW than LMW Wt % is preferred. The SEC curve can be further analyzed to give percent of Wt %>1 MM, which is the weight percent of the total MWD that has a molecular weight greater than 1 million, and Wt %>100K, which is the weight perecent of the total MWD that is greater than 100,000 in molecular weight. The weight percent ratio is simply Wt %>1 MM divided by Wt %>100K. 100,000 was used as an approximate means of dividing the total MWD into a high molecular weight and a low molecular weight region. This ratio gives a simple but sensitive indication of the relative amount of the very high molecular weight species in the HMW region of the MWD. The preferred embodiment of the polymer has the preferred range of weight percent ratio (WPR), higher than 10 but less than 30, preferably higher than 15 but less than 25. The stability of blown bubble during film extrusion depends on this WPR. A catalyst system that can be used in some reactions to produce these polymers comprises [(2,4,6-Me$_3$C$_6$H$_2$)NCH$_2$CH$_2$]$_2$NH}HfBz$_2$ or [(2,4,6-Me$_3$C$_6$H$_2$)NCH$_2$CH$_2$]$_2$NH}ZrBz$_2$ combined with bis(indenyl)zirconium dichloride, (pentamethylcyclopentadienyl)(n-propylcyclopentadienyl)zirconium dichloride or (tetramethylcyclopentadienyl)(n-propylcyclopentadienyl)zirconium dichloride, and supported methylalumoxane.

Figure 2:
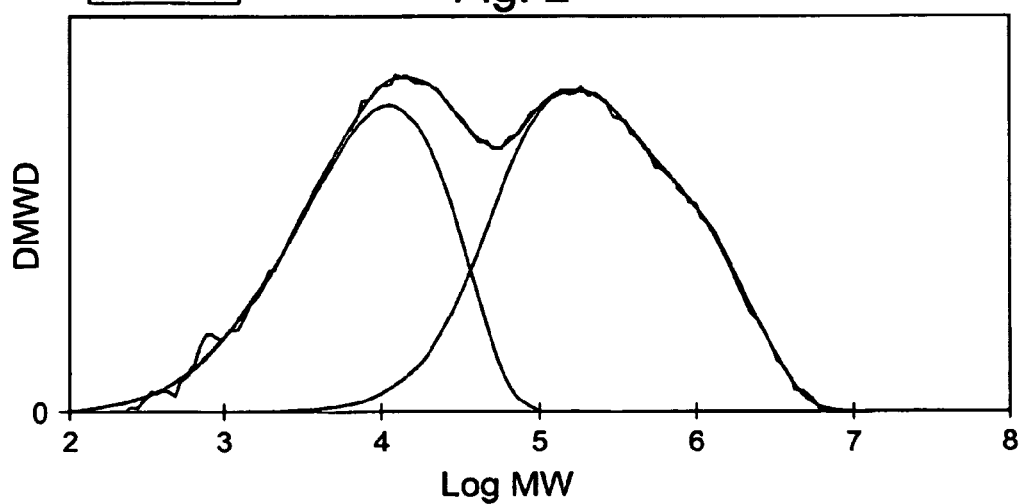
FIG. 2 is a molecular weight distribution curve for a bimodal polymer, and two individual molecular weight distribution curves (generated by deconvolution) for components thereof.

FIG. 2 is a molecular weight distribution curve characterizing the bimodal polymer described in the previous paragraph. Two distinctive peaks are apparent in FIG. 2, one each for an HMW fraction and an LMW fraction of the polymer (each peak corresponding to one of the two deconvoluted curves also shown in FIG. 2). The following table indicates parameters of the polymer whose molecular weight distribution curve is shown in FIG. 2:

|  | LMW | HMW | Overall |
| --- | --- | --- | --- |
| $M_n$: | 3,231 | 91,514 | 8,076 |
| $M_w$: | 12,307 | 505,322 | 291,217 |
| $M_w/M_n$: | 3.81 | 5.52 | 36.06 |
| Wt %: | 43.57% | 56.43% | |

The bimodal polymer characterized by FIG. 2 is expected to exhibit excellent bubble stability and good film extrusion characteristics, with excellent draw-down characteristics, and to be useful to produce films having thickness as low as 0.35 mil with excellent film dart impact strength (suitable for grocery sack applications).

In another embodiment a bimodal polymer produced in accordance with the present invention has the following characteristics: a density of 0.93 to 0.97 g/cc, an MI ($I_2$) of 0.02-0.5 g/10 min, a flow index ("FI" or "$I_{21}$") of 10-40 g/10-40 g/10 min, an MFR ($I_{21}/I_2$) of 50-300, an $M_w$ of 100,000 to 500,000, an $M_n$ of 8,000-20,000 and an Mw/Mn of 10-40. Such a polymer is particularly useful for blow molding applications, and would be expected to exhibit excellent Bent Strip ESCR (environmental stress crack resistance) performance, far exceeding that of unimodal HDPE, and to be useful to produce blow molded bottles that are easily trimmed and have opaque finish (often preferred over the translucent finish of unimodal HDPE).

Other embodiments of the inventive polymerization method produce propylene based polymers. These polymers include atactic polypropylene, isotactic polypropylene, hemi-isotactic and syndiotactic polypropylene or mixtures thereof produced by using two or more different catalysts in accordance with this invention. Other propylene polymers include propylene block or impact copolymers. Propylene polymers of these types are well known in the art Polymers produced in accordance with some embodiments of the invention may be blended and/or coextruded with other polymers. Non-limiting examples of other polymers include linear low density polyethylenes produced via conventional Ziegler-Natta and/or metallocene catalysis, elastomers, plastomers, high pressure low density polyethylene, high density polyethylenes, polypropylenes and the like.

Polymers produced in accordance with some embodiments of the invention and blends thereof are useful in such forming operations as film, sheet, and fiber extrusion and co-extrusion as well as blow molding, injection molding, and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

In some embodiments, the inventive method produces bimodal polymer suitable for being formed into pipes by methods known in the art. For pipe applications, the polymers may have a flow index ($I_{21}$) of from about 2 to about 10 dg/min and preferably from about 2 to about 8 dg/min. In some embodiments, the pipe satisfies ISO qualifications. In some embodiments, the present invention is used to make polyethylene pipe having a predicted S-4 $T_c$ for 110 mm pipe of less than −5° C., preferably of less than −15° C. and more preferably less than −40° C. (ISO DIS 13477/ASTM F1589).

Polyolefins produced in accordance with some embodiments of the invention can be made into films, molded articles (including pipes), sheets, wire and cable coating and the like. The films may be formed by any of the conventional techniques known in the art including extrusion, co-extrusion, lamination, blowing and casting. The film may be obtained by the flat film or tubular process which may be followed by orientation in a uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

While not wishing to be bound by any theory, it is believed that bimodal polymers produced in accordance with typical embodiments of the invention have the unique advantage that HMW and LMW polymer fractions of the product are so intimately blended that there is an even distribution of the two polymers across the polymer particles as they exit the reactor.

Typically, the bimodal polymer produced in accordance with the invention has the desirable attribute that the polydispersity index $M_w/M_n$ of the different fractions does not vary significantly.

In preferred embodiments, the bimodal polymer produced in accordance with the invention comprises 10-90 weight % of low molecular weight polymer (low is 50,000 or less preferably 40,000 or less), preferably 20 to 80 weight %, more preferably 40-60 weight %, based upon the weight of the polymer.

In some embodiments, the produced bimodal polyolefin has at least two species of molecular weights present at greater than 20 weight % based upon the weight of the polymer.

In order to provide a better understanding of the present invention, the following examples are provided.

EXAMPLES

It is to be understood that while the invention has been described in conjunction with the specific embodiments thereof, the foregoing description is intended to illustrate and not limit the scope of the invention. Other aspects, advantages, and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

Tests during a polymerization reaction producing bimodal polyethylene in a fluidized bed reactor (in a non-condensed reactor operating mode) using a catalyst system comprising a Group 15 and metal containing catalyst compound (for catalyzing polymerization of an HMW fraction of the product), a metallocene catalyst component (for catalyzing polymerization of an LMW fraction of the product), and a trim solution, have indicated to the inventors that increasing the concentration of isopentane in the reactor (while maintaining other reaction parameters at least substantially constant) almost immediately decreases hydrogen consumption relative to consumption of ethylene feed. This indicates that the increased isopentane concentration increased the activity of the Group 15 and metal containing catalyst compound relative to that of the metallocene catalyst compound. The component of the bimodal catalyst system for catalyzing polymerization of the HMW fraction of the product was the zirconium-containing compound identified above as "Compound 1" (also referred to as "bis(arylamido)Zr dibenzl"). In some tests, the bimodal catalyst system's metallocene catalyst component (for catalyzing polymerization of the LMW fraction of the product) included ligands bonded to zirconium dichloride (e.g., tetramethylcyclopentadienyl)(n-propylcylcopentadienyl) Zr dichloride, or (pentamethylcyclopentadienyl)(n-propylcylcopentadienyl) Zr dichloride, or bis(n-butylcyclopentadienyl) Zr dichloride); in others it included ligands bonded to zirconium dimethyl (e.g., tetramethylcyclopentadienyl)(n-propylcylcopentadienyl) Zr dimethyl, or (pentamethylcyclopentadienyl)(n-propylcylcopentadienyl) Zr dimethyl). The trim solution of the bimodal catalyst system included some of the metallocene catalyst component.

The tests were performed with a catalyst composition of the noted type in a fluidized bed polymerization reactor operating with an initial isopentane concentration of about 5%, a total pressure of about 270 psig, an ethylene partial pressure of 220 psi, and a hydrogen-to-ethylene concentration ratio of 0.0035. The reactor produced bimodal polyethylene having a melt flow ratio (MFR) of about 160, an average flow index of 8.3 and density of 0.948 g/cm$^3$.

Figure 3:
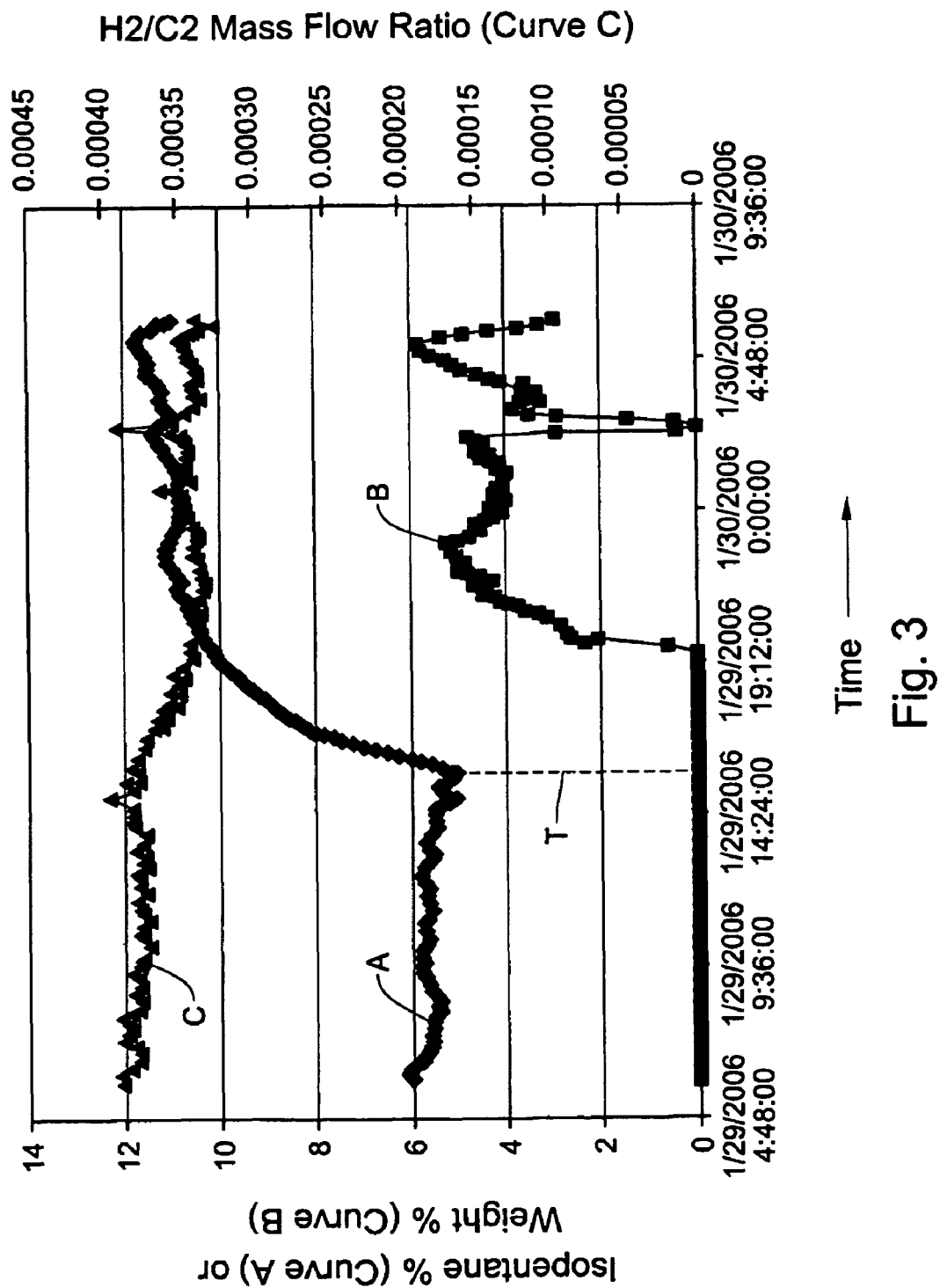
FIG. 3 is a set of graphs of data measured during a polymerization reaction (producing bimodal polyethylene) in a fluidized bed reactor, showing concentration of isopentane in the reactor (curve "A"), hydrogen feed rate-to-ethylene feed rate ratio (curve "C"), and weight percentage of condensed liquid in the cycle gas at the reactor bottom inlet (curve "B").

Some results of the tests described in the previous paragraph are shown in FIG. 3. FIG. 3 indicates that when concentration of isopentane in the reactor (curve "A") increased from 5.2% (at time "T") to 11.6%, the hydrogen feed rate-to-ethylene feed rate ratio (the ratio of amount of hydrogen to ethylene fed into the reactor, plotted as curve "C") decreased steadily over time. In FIG. 3, curve "B" is a plot of the weight percentage of condensed liquid in the cycle gas at the reactor bottom inlet. FIG. 3 indicates that the reaction change (commencing at time "T" as indicated by curve "C") is correlated with a change in isopentane concentration rather than a change in the weight percentage of condensed liquid in the cycle gas.

FIG. 3 evidences that during non-condensed mode operation of the reactor, increasing the concentration of isopentane in the reactor from 5.2% to 11.6% increased the activity of the component (the Group 15 and metal containing catalyst component) of the bimodal catalyst composition that catalyzes polymerization of the HMW fraction of the bimodal polymer product relative to that of the metallocene catalyst component of the bimodal catalyst composition. The increase in concentration of isopentane in the reactor also increased the trim requirement and slightly reduced the product's melt flow ratio ("MFR"=$I_{21}/I_5$, where $I_{21}$ and $I_5$ are conventionally defined flow indices): the ratio of trim solution to total amount of catalyst increased from 0.07 to 0.1 (in units of pounds of trim solution per pound of catalyst slurry), where the slurry comprised 22 wt % of solid and the trim solution was a 0.6 wt % LMW component trim solution; and the product's MFR decreased from 33.2 to 29.3.

Additional tests were performed during bimodal polyethylene-producing polymerization reactions in a fluidized bed reactor (in non-condensed reactor operating modes) using a catalyst system comprising a Group 15 and metal containing catalyst compound (for catalyzing polymerization of an HMW fraction of the product) and a metallocene catalyst component (for catalyzing polymerization of an LMW fraction of the product), with a trim solution comprising the metallocene catalyst. The tests showed that increasing the concentration of isopentane in the reactor from about 5% to about 11% without significantly changing other reaction parameters (other than feed rate of the trim solution) resulted in production of substantially the same bimodal polyethylene product. The trim solution feed rate requirement increased from 0.7 to 0.8 lb. of trim solution per lb. of catalyst slurry due to the isopentane concentration increase. The product produced with higher isopentane concentration (about 11%) had slightly narrower MFR (36.0 versus 38.4) and lower flow index "FI" (FI=5.0 decigrams per minute versus 5.24 decigrams per minute) than with lower isopentane concentration (about 5%), and the catalyst productivity during polymerization with the higher isopentane concentration was slightly higher than with the lower isopentane concentration (6800 lbs. of product per lb. of catalyst system, versus 6300 lbs. of product per lb. of catalyst system). The higher trim solution feed rate requirement, even with a lower flow index, indicates that increased isopentane concentration (11% rather than about 5%) resulted in enhanced productivity (and activity) of the Group 15 and metal containing catalyst component of the bimodal catalyst system (for catalyzing polymerization of the product's HMW fraction) relative to that of the metallocene catalyst component of the bimodal catalyst system (for catalyzing polymerization of the product's LMW fraction).

Figure 4:
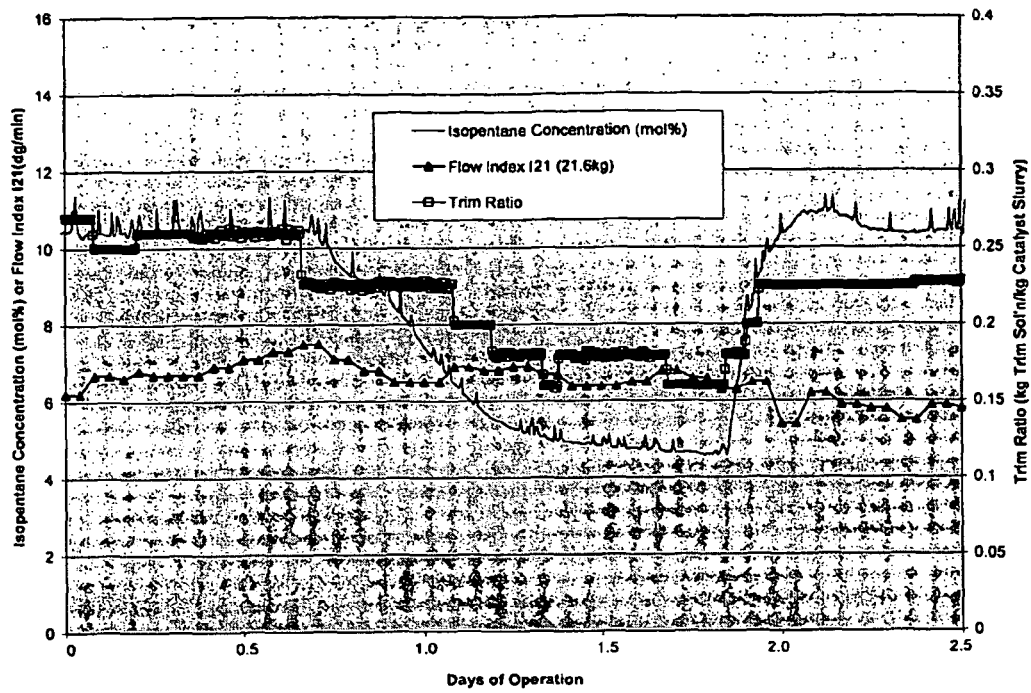
FIGS. 4 and 5 are graphs showing the flow index response to various levels of ICA, e.g., isopentane, in some exemplary embodiments.
Figure 5:
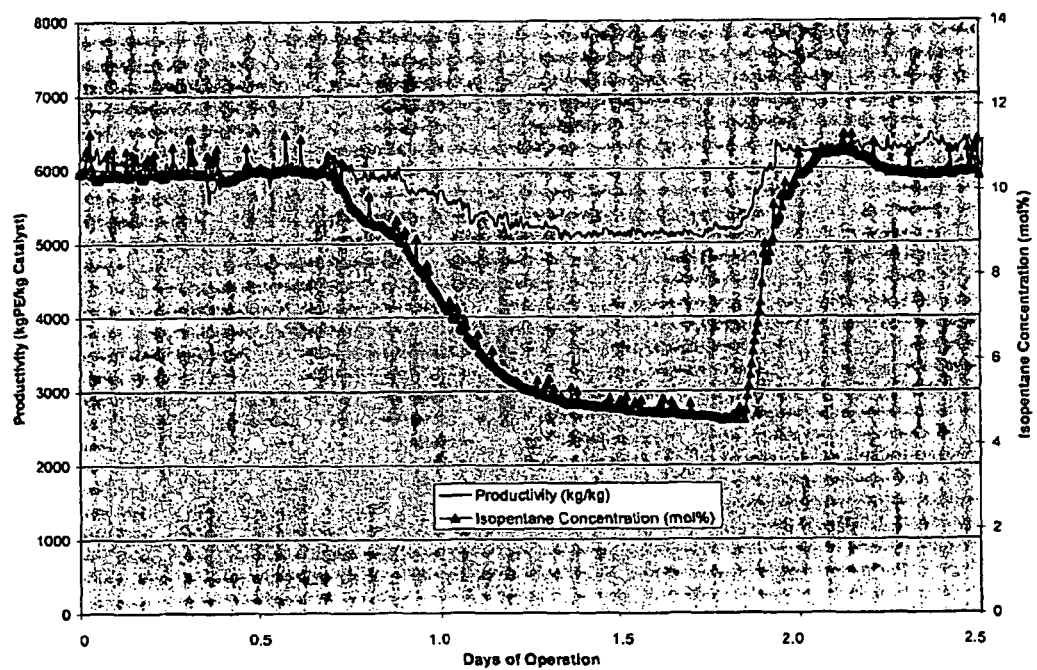

In another example in dry mode operation at 105° C. reactor temperature, the concentration of isopentane was lowered from about 10.5% to about 5% and then raised back up to about 10.5% and the trim solution to catalyst slurry flow ratio was adjusted in conjunction with the isopentane concentration in order to maintain the aim flow index of the bimodal polyethylene produced. The data corresponding to this examples is shown in FIGS. 4 and 5. In this example, the catalyst productivity was about 6000 kgPE/kg catalyst at the initial 10.5% isopentane condition, and dropped to about 5300 kg/kg at 5% isopentane, and then increased back to about 6300 kg/kg when the pentane concentration was increased back to about 10.5-11%. The trim solution to catalyst slurry flow ratio was lowered from about 0.26 kg/kg at 10.5% isopentane to 0.16% kg/kg at 5% isopentane in order to maintain the desired polymer flow index.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A polymerization method comprising:
(a) operating a gas phase polymerization reactor to perform a polymerization reaction that produces a bimodal polymer, wherein the reaction is catalyzed by a bimodal polymerization catalyst composition; and
(b) varying a concentration of at least one induced condensing agent in the reactor while performing the reaction, thereby implementing a predetermined change in at least one of activity of the catalyst composition and at least one property of the bimodal polymer,
wherein the at least one induced condensing agent comprises hexane, isohexane, pentane, isopentane, butane, or isobutene;
wherein the separately induced condensing agent is separately added directly to the polymerization reactor or to the recycle line of the polymerization reactor, where the induced condensing agent does not contact the catalyst composition before entering the polymerization reactor; and
wherein the bimodal polymerization catalyst composition comprises at least one HMW catalyst for catalyzing polymerization of a high molecular weight fraction of the polymer and at least one LMW catalyst for catalyzing polymerization of a low molecular weight fraction of the polymer, and wherein the HMW catalyst comprises a Group 15 and metal containing compound represented by the formulae:

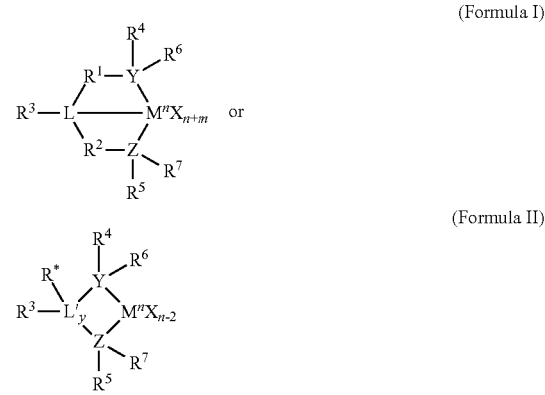

wherein
M is a Group 3 to 12 transition metal or a Group 13 or 14 main group metal,
each X is independently hydrogen, a hydrocarbyl group, a heteroatom or a halogen,
y is 0 or 1,
n is the oxidation state of M, preferably +3, +4, or +5,
m is the formal charge of the YZL or the YZL' ligand, preferably 0, −1, −2 or −3,
L is a Group 15 or 16 element,
L' is a Group 15 or 16 element or Group 14 containing group,
Y is a Group 15 element,
Z is a Group 15 element,
$R^1$ and $R^2$ are independently a $C_1$ to $C_{20}$ hydrocarbon group, a heteroatom containing group having up to twenty carbon atoms, silicon, germanium, tin, lead, halogen or phosphorus,
$R^3$ is absent or a hydrocarbon group, hydrogen, a halogen, a heteroatom containing group, preferably a linear, cyclic or branched alkyl group having 1 to 20 carbon atoms,
$R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system,
$R^6$ and $R^7$ are independently absent, or hydrogen, an alkyl group, halogen, heteroatom or a hydrocarbyl group,
$R^*$ is absent, or is hydrogen, a Group 14 atom containing group, a halogen, or a heteroatom containing group.

2. The method of claim 1, wherein the concentration of the at least one induced condensing agent in the reactor is varied so as to bring the bimodal polymer into compliance with a predetermined product specification set.

3. The method of claim 1, wherein the concentration of the at least one induced condensing agent is varied so as to control the amount of a high molecular weight fraction of the polymer produced relative to the amount of a low molecular weight fraction of the polymer produced.

4. The method of claim 1, wherein the at least one induced condensing agent is isopentane.

5. The method of claim 1, wherein the LMW catalyst is a metallocene catalyst compound.

6. The method of claim 5, wherein the bimodal polymerization catalyst composition includes a trim solution in which at least some of the LMW catalyst is dissolved.

7. The method of claim 5, wherein the bimodal polymerization catalyst composition includes a trim solution in which at least some of the HMW catalyst is dissolved.

8. The method of claim 1, comprising varying the concentration of the at least one induced condensing agent to control relative activity of the HMW catalyst and the LMW catalyst.

9. The method according to claim 4 further comprising increasing concentration of the isopentane in the reactor, thereby increasing activity of the HMW catalyst relative to activity of the LMW catalyst.

10. The method of claim 1, wherein the HMW catalyst comprises bis(arylamido)Zr dibenzl, where "Zr" denotes zirconium.

11. The method of claim 5, wherein the metallocene catalyst component is one of (tetramethylcyclopentadienyl)(n-propylcylcopentadienyl) Zr dichloride, (tetramethylcyclopentadienyl)(n-propylcylcopentadienyl) Zr dimethyl, (pentamethylcyclopentadienyl)(n-propylcylcopentadienyl) Zr dichloride, (pentamethylcyclopentadienyl)(n-propylcylcopentadienyl) Zr dimethyl, and bis(n-butylcyclopentadienyl) Zr dichloride.

12. The method of claim 1, wherein the bimodal polymer is a polyolefin.

13. The method according to claim 12 wherein the polyolefin is polyethylene.

* * * * *